(12) United States Patent
Pan et al.

(10) Patent No.: US 10,684,540 B2
(45) Date of Patent: Jun. 16, 2020

(54) ILLUMINATION SYSTEM AND PROJECTION APPARATUS

(71) Applicant: Coretronic Corporation, Hsin-Chu (TW)

(72) Inventors: Haw-Woei Pan, Hsin-Chu (TW); Chi-Tang Hsieh, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 0 days.

(21) Appl. No.: 16/246,552

(22) Filed: Jan. 14, 2019

(65) Prior Publication Data

US 2019/0227416 A1 Jul. 25, 2019

(30) Foreign Application Priority Data

Jan. 19, 2018 (CN) .......................... 2018 1 0054095

(51) Int. Cl.
G03B 21/20 (2006.01)
G03B 21/00 (2006.01)
G02B 27/10 (2006.01)
G03B 33/00 (2006.01)

(52) U.S. Cl.
CPC ........... *G03B 21/204* (2013.01); *G02B 27/10* (2013.01); *G03B 21/00* (2013.01); *G03B 21/008* (2013.01); *G03B 21/208* (2013.01); *G03B 21/2013* (2013.01); *G03B 33/00* (2013.01)

(58) Field of Classification Search
None
See application file for complete search history.

(56) References Cited

U.S. PATENT DOCUMENTS

| 2011/0228232 A1* | 9/2011 | Sakata .................... G02B 7/008 353/31 |
| 2014/0347634 A1 | 11/2014 | Bommerbach |
| 2015/0098070 A1 | 4/2015 | Hsieh et al. |
| 2016/0147135 A1 | 5/2016 | Cheng |
| 2016/0187644 A1* | 6/2016 | Bhakta ............... G02B 26/0833 359/292 |

(Continued)

FOREIGN PATENT DOCUMENTS

| CN | 2525547 | 12/2002 |
| CN | 104238248 | 12/2014 |

(Continued)

OTHER PUBLICATIONS

"Search Report of Europe Counterpart Application", dated Feb. 28, 2019, p. 1-p. 10.

*Primary Examiner* — Britt D Hanley
(74) *Attorney, Agent, or Firm* — JCIPRNET

(57) ABSTRACT

An illumination system including a first excitation light source, a wavelength conversion element, and a scattering element is provided. The first excitation light source emits a first excitation beam. The wavelength conversion element includes a wavelength conversion material. The wavelength conversion element has a first region and a second region. A concentration of the wavelength conversion material in the first region is greater than a concentration of the wavelength conversion material in the second region. The scattering element is disposed on a transmission path of the first excitation beam. A projection apparatus with the illumination system is also provided.

32 Claims, 21 Drawing Sheets

(56) References Cited

U.S. PATENT DOCUMENTS

2016/0327851 A1* 11/2016 Liao .................. G03B 21/204
2017/0293212 A1   10/2017 Wang
2018/0173087 A1    6/2018 Hsieh et al.

FOREIGN PATENT DOCUMENTS

| CN | 104267567   |   | 1/2015  |
|----|-------------|---|---------|
| CN | 104345534   |   | 2/2015  |
| CN | 104980721   |   | 10/2015 |
| CN | 105022212   |   | 11/2015 |
| CN | 105353578   |   | 2/2016  |
| CN | 104216210   |   | 1/2017  |
| CN | 106412535   |   | 2/2017  |
| CN | 106412535 B | * | 3/2019  |
| JP | 2015031876  |   | 2/2015  |
| TW | M331685     |   | 5/2008  |
| TW | 201514603   |   | 4/2015  |
| TW | 201542966   |   | 11/2015 |
| TW | M547687     |   | 8/2017  |
| TW | 201822184   |   | 6/2018  |

\* cited by examiner

ILLUMINATION SYSTEM AND PROJECTION APPARATUS

CROSS-REFERENCE TO RELATED APPLICATION

This application claims the priority benefit of China application serial no. 201810054095.3, filed on Jan. 19, 2018. The entirety of the above-mentioned patent application is hereby incorporated by reference herein and made a part of this specification.

BACKGROUND

Technical Field

The disclosure relates to a projection apparatus having two light valves, and more particularly relates to an illumination system used in a projection apparatus having two light valves.

Description of Related Art

In the architecture of a laser light source projector, basically, a blue laser beam is emitted to phosphor and a reflective region (or transmissive region) of a phosphor wheel sequentially to output yellow and blue beams, and then the dichroic mirror in the projector divides red and green beams from the yellow beam to form two primary color beams, so as to form blue, green, and red color beams. The aforementioned three color beams are transmitted to two light valves in the projector at different timings. Specifically, in the time interval when the blue laser beam is emitted to the phosphor, the yellow beam emitted by the phosphor is divided into the red beam and the green beam by the dichroic mirror. The dichroic mirror transmits the red beam and the green beam to the two light valves at different positions by different light transmission paths according to different wavelength ranges. However, in the time interval when the blue beam is transmitted to the reflective region (or transmissive region), the blue beam can be transmitted to only one of the two light valves. Since the other light valve does not receive the color beam, it is in an idle state, which lowers the optical efficiency of the projector as well as causes color interruption and results in poor image quality.

The information disclosed in this Background section is only for enhancement of understanding of the background of the described technology and therefore it may contain information that does not form the prior art that is already known to a person of ordinary skill in the art. Further, the information disclosed in the Background section does not mean that one or more problems to be resolved by one or more embodiments of the invention was acknowledged by a person of ordinary skill in the art.

SUMMARY

The disclosure provides an illumination system, which enables a projection apparatus that uses the illumination system to achieve favorable optical efficiency and favorable image quality.

The disclosure provides a projection apparatus, which achieves favorable optical efficiency and favorable image quality.

Other objects and advantages of the disclosure may be understood from the technical features of the disclosure.

For one or some or all of the aforementioned objects or for other objects, according to an embodiment of the disclosure, an illumination system is provided. The illumination system includes a first excitation light source, a wavelength conversion element, and a scattering element. The first excitation light source is configured to emit a first excitation beam. The wavelength conversion element includes a wavelength conversion material. The wavelength conversion element has a first region and a second region. A concentration of the wavelength conversion material in the first region is greater than a concentration of the wavelength conversion material in the second region. The first region and the second region sequentially enter into a transmission path of the first excitation beam. The first excitation beam is transmitted to the first region and excites the wavelength conversion material in the first region to emit a first conversion beam. The first excitation beam is transmitted to the second region and a part of the first excitation beam excites the wavelength conversion material in the second region to emit a second conversion beam. Another part of the first excitation beam passes through the second region. The scattering element is disposed on the transmission path of the first excitation beam. The illumination system outputs the first conversion beam, a part of the second conversion beam, and another part of the first excitation beam.

For one or some or all of the aforementioned objects or for other objects, according to an embodiment of the disclosure, a projection apparatus is provided. The projection apparatus includes the aforementioned illumination system, a third splitting element, a first light valve, a second light valve and a projection lens. The third splitting element is disposed on transmission paths of the first conversion beam, the part of the second conversion beam, and another part of the first excitation beam. The third splitting element splits the first conversion beam into a first color beam and a second color beam, and the part of the second conversion beam is a third color beam. The first light valve is disposed on transmission paths of the first color beam and the third color beam. The first light valve converts the first color beam into a first image beam or converts the third color beam into a third image beam. The third splitting element guides the first color beam or the third color beam to the first light valve. The second light valve is disposed on transmission paths of the second color beam and another part of the first excitation beam. The second light valve converts the second color beam into a second image beam and/or converts another part of the first excitation beam into a fourth image beam. The third splitting element guides the second color beam or another part of the first excitation beam to the second light valve. The projection lens is disposed on transmission paths of the first image beam, the second image beam, the third image beam, and the fourth image beam.

Based on the above, in the illumination system according to the embodiments of the disclosure, the first excitation beam is transmitted to the first region and the second region that have the wavelength conversion material at different concentrations on the wavelength conversion element, and during the time intervals when the first excitation beam is transmitted to the first region and the second region, the illumination system is able to output beams to the first light valve and the second light valve in the projection apparatus, so as to prevent one of the light valves from falling into an idle state. Therefore, the projection apparatus in the embodiments of the disclosure achieves favorable optical efficiency and favorable image quality.

Other objectives, features and advantages of the invention will be further understood from the further technological features disclosed by the embodiments of the invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DETAILED DESCRIPTION OF DISCLOSED EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1A:
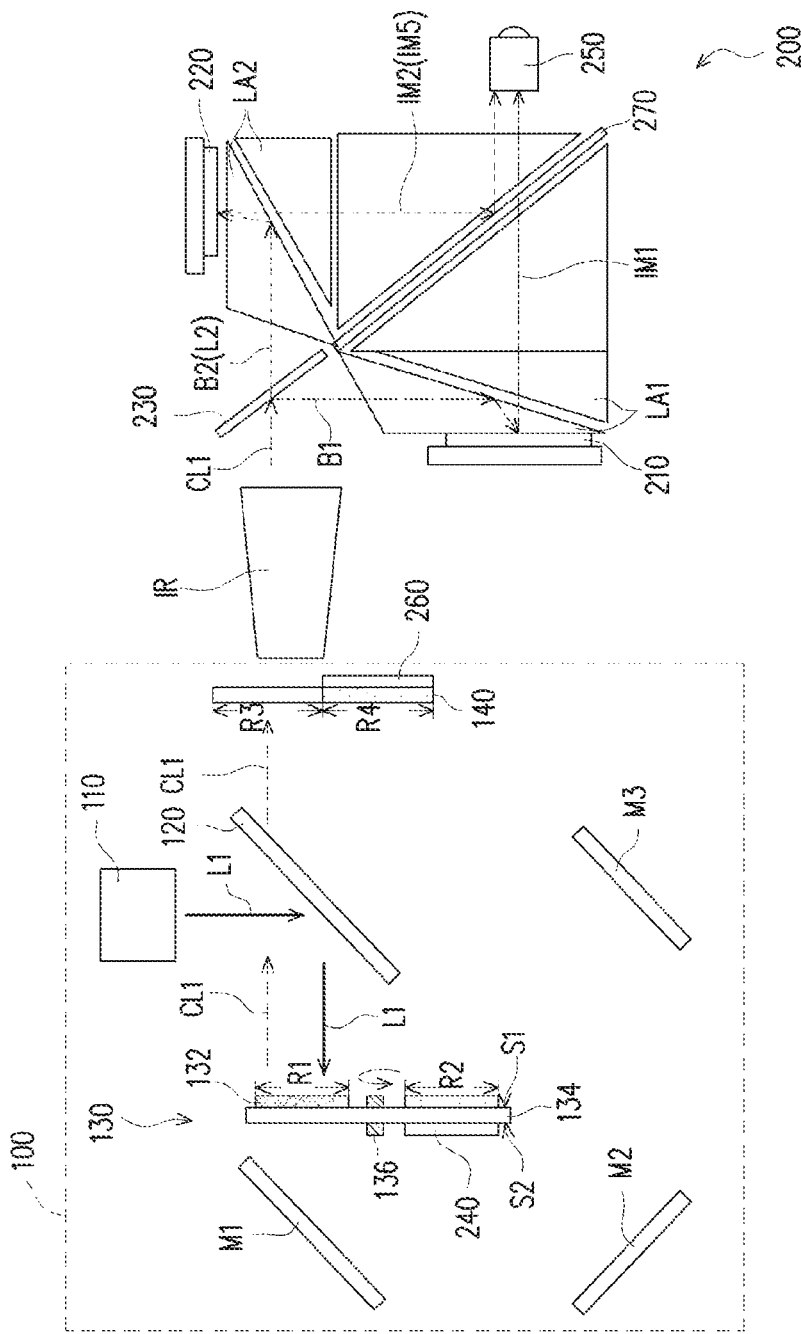
FIG. 1A is a schematic diagram of optical paths of a projection apparatus during a first time interval according to an embodiment of the disclosure.
Figure 1B:
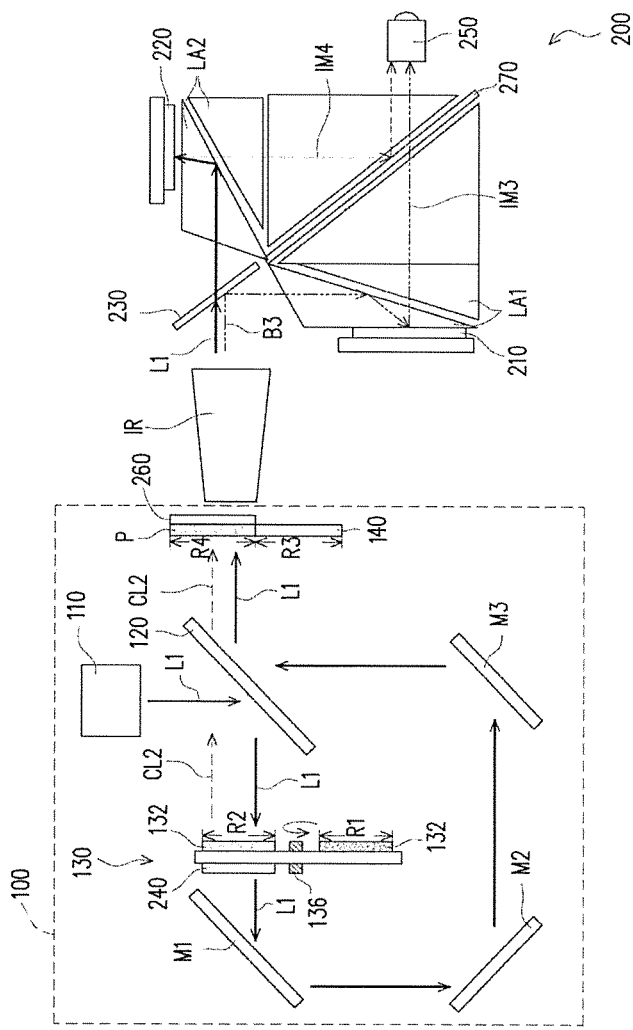
FIG. 1B is a schematic diagram of optical paths of the projection apparatus in FIG. 1A during a second time interval.

FIG. 1A is a schematic diagram of optical paths of a projection apparatus during a first time interval according to an embodiment of the disclosure. FIG. 1B is a schematic diagram of optical paths of the projection apparatus in FIG.

Figure 1C:
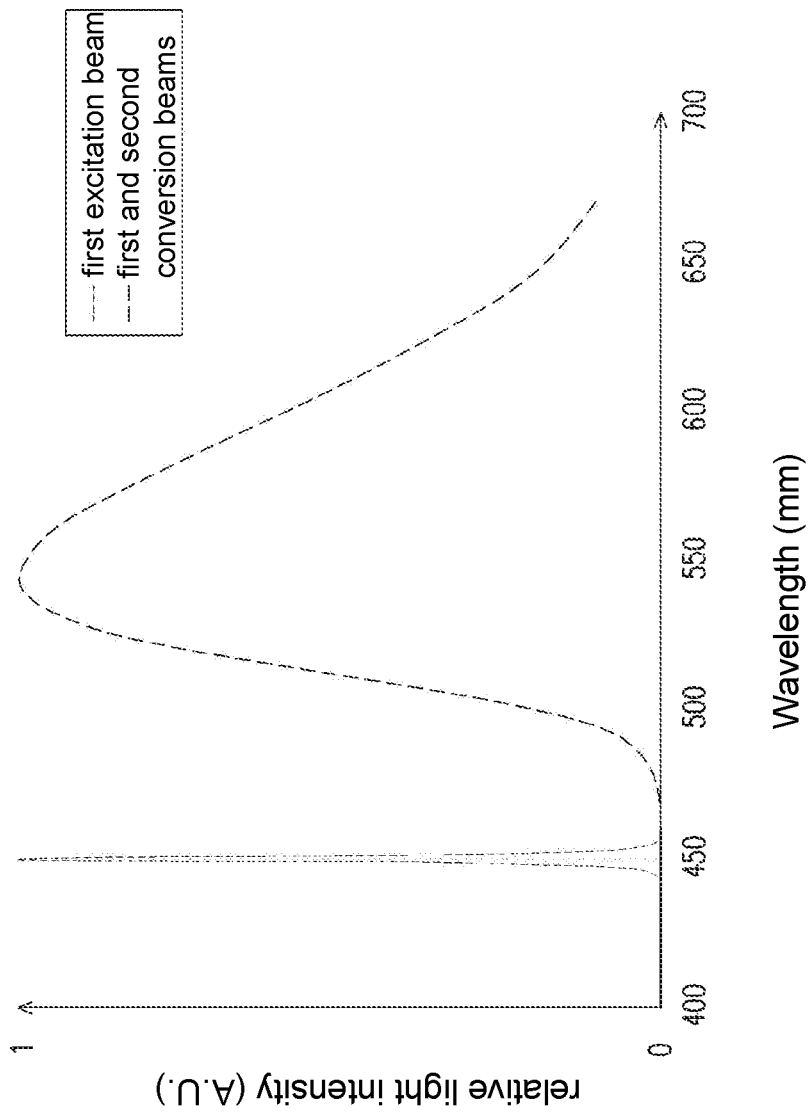
FIG. 1C is a graph showing the relationship between the wavelengths and relative light intensities of a first excitation beam and first and second conversion beams in FIG. 1A and FIG. 1B.
Figure 1D:
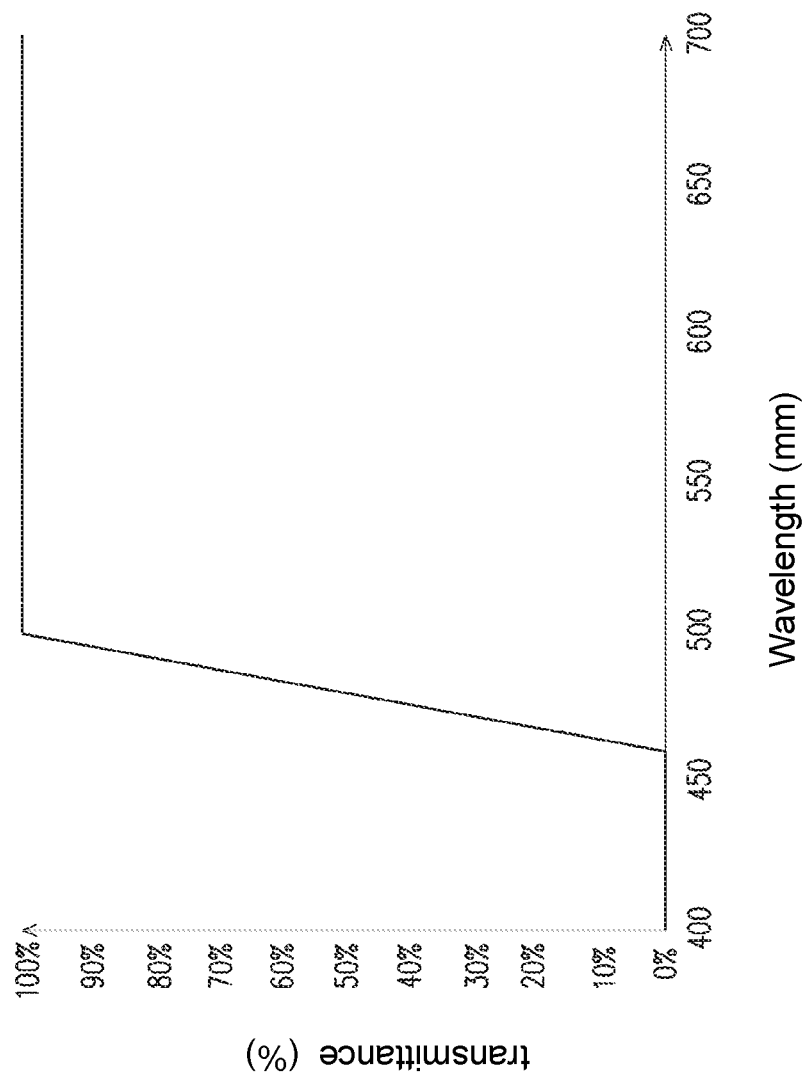
FIG. 1D is a graph showing the relationship between the wavelength and transmittance of a first splitting element in FIG. 1A and FIG. 1B.
Figure 2A:
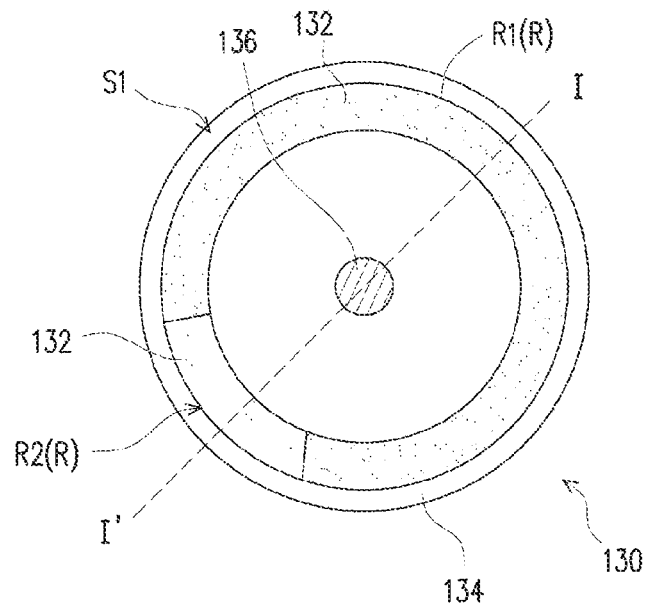
FIG. 2A is a schematic front view of a wavelength conversion element of the projection apparatus in FIG. 1A.
Figure 2B:
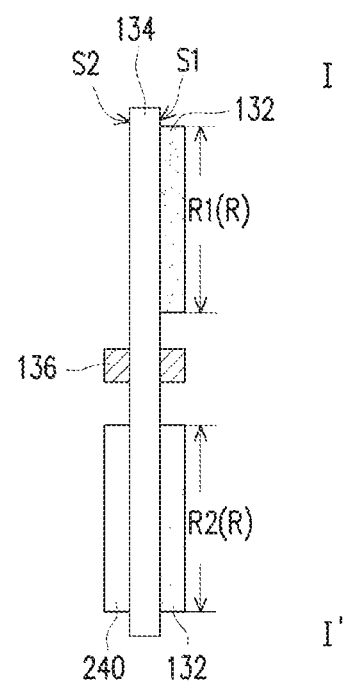
FIG. 2B is a schematic side view of the wavelength conversion element in FIG. 2A.
Figure 3:
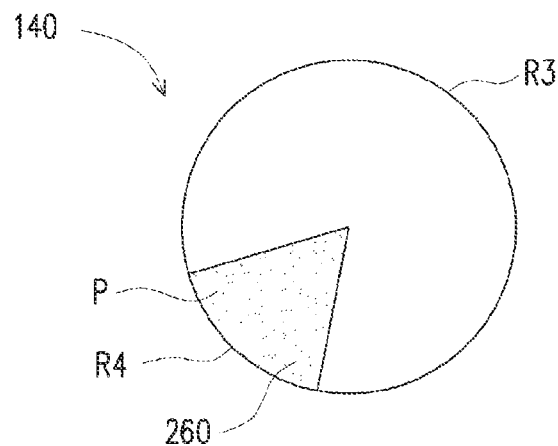
FIG. 3 is a schematic front view of a scattering element in FIG. 1A and FIG. 1B.
Figure 4:
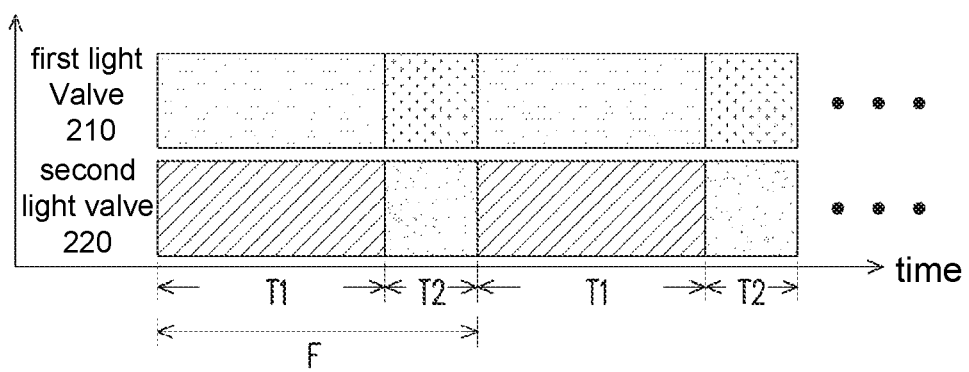
FIG. 4 is a schematic diagram showing colors of the color beams received by first and second light valves during the first and second time intervals.

1A during a second time interval. FIG. 1C is a graph showing the relationship between the wavelengths and relative light intensities of a first excitation beam and first and second conversion beams in FIG. 1A and FIG. 1B. FIG. 1D is a graph showing the relationship between the wavelength and transmittance of a first splitting element in FIG. 1A and FIG. 1B. FIG. 2A is a schematic front view of a wavelength conversion element of the projection apparatus in FIG. 1A. FIG. 2B is a schematic side view of the wavelength conversion element in FIG. 2A. FIG. 3 is a schematic front view of a scattering element in FIG. 1A and FIG. 1B. FIG. 4 is a schematic diagram showing colors of the color beams received by first and second light valves during the first and second time intervals.

Referring to FIG. 1A, FIG. 1B, FIG. 2A, and FIG. 2B, in this embodiment, a projection apparatus 200 includes an illumination system 100, a first light valve 210, a second light valve 220, a projection lens 250, and a light combining element 270. The illumination system 100 is configured to output a beam to a first light valve 210 and a second light valve 220. The illumination system 100 includes a first excitation light source 110, a first splitting element 120, a wavelength conversion element 130, and a scattering element 140. In other embodiments, the illumination system 100 further includes a second splitting element 160. In this embodiment, the projection apparatus 200 further includes a third splitting element 230. In this embodiment, the wavelength conversion element 130 of the illumination system 100 further includes a fourth splitting element 240, and the illumination system 100 further includes a filter element 260. The following paragraphs will describe in detail the relative positions and functions of the aforementioned elements.

In the embodiments of the disclosure, the first excitation light source 110 generally refers to a light source that is capable of emitting a short-wavelength beam and is basically defined as a light source that is capable of exciting phosphor particles to generate a long-wavelength beam. A peak wavelength of the short-wavelength beam falls within the wavelength range of blue light or ultraviolet light, for example, wherein the peak wavelength is defined as the wavelength corresponding to the maximum light intensity. The first excitation light source 110 includes a single light source, such as a laser diode (LD) and a light emitting diode (LED), or a matrix composed of one of the aforementioned (e.g., a plurality of LDs or LEDs), for example. Nevertheless, the disclosure is not limited thereto. In this embodiment, the first excitation light source 110 is configured to emit a first excitation beam L1. Referring to FIG. 1C, the first excitation beam L1 is a blue excitation beam, for example, and has a blue light spectrum. The peak wavelength of the first excitation beam L1 is in a range of 400 nm to 470 nm, but not limited thereto. In the embodiments of the disclosure, the peak wavelength of the first excitation beam L1 is 455 nm, for example.

In the embodiments of the disclosure, the splitting elements (e.g., the first, third, and fourth splitting elements 120, 230, and 240) are optical elements having beam-splitting function. In this embodiment, the splitting element is a dichroic mirror (DM), which has selectivity in wavelength range and is a dichroic sheet that splits light through transmission or reflection by limiting the range of wavelength/color, but not limited thereto. In this embodiment, referring to FIG. 1D, the first splitting element 120 is designed as a splitting element that reflects a blue beam and allows a green beam and a red beam to pass through. Specifically, the first splitting element 120 reflects a beam in the wavelength range that presents blue and allows beams in the wavelength ranges that present green and red to pass through. The third splitting element 230 is designed as a splitting element that allows a blue beam and a red beam to pass through and reflects a green beam. The fourth splitting element 240 is designed as a splitting element that reflects a yellow beam. It should be noted that the designs of the aforementioned splitting elements that reflect a certain color beam or allow a certain color beam to pass through are merely examples and are not intended to limit the disclosure.

In the embodiments of the disclosure, the wavelength conversion element 130 is an optical element configured to convert the short-wavelength beam that passes through the wavelength conversion element 130 into a long-wavelength beam with respect to the short-wavelength beam. In this embodiment, the wavelength conversion element 130 is a wheel having a phosphor layer, such as a phosphor wheel, but not limited thereto. Referring to FIG. 2A and FIG. 2B, specifically, a specific form of the wavelength conversion element 130 is, for example, a transmissive phosphor wheel, which is defined as that a part of the first excitation beam L1 is allowed to pass through a partial region of the phosphor wheel. The wavelength conversion element 130 includes a wavelength conversion material 132, a substrate 134, and a rotation shaft 136. The wavelength conversion material 132 in the embodiments of the disclosure includes phosphor. The wavelength conversion material 132 may receive the short-wavelength beam and generate a corresponding conversion beam by photoluminescence. The wavelength conversion material 132 may be covered by a colloid to form a phosphor colloid layer. The phosphor may be a phosphor for exciting a yellow beam, which may be referred to as a yellow phosphor, for example, but not limited thereto. In the case where the wavelength conversion material 132 is the yellow phosphor, for example, a first conversion beam CL1 and a second conversion beam CL2, which are excited and obtained through conversion, have a wavelength range of 470 nm to 650 nm and have a yellow light spectrum. Referring to FIG. 1C, the peak wavelength of the yellow light is in a range of 535 nm to 570 nm. Therefore, the first conversion beam CL1 and the second conversion beam CL2 are conversion beams in the yellow wavelength range. The substrate 134 is a light-transmissive substrate, for example, and has a surface S1 and a surface S2 opposite to each other, and the surface S1 faces the first splitting element 120. The rotation shaft 136 is disposed through a geometric center of the substrate 134 and is coupled to a driving element (not shown) to drive the wavelength conversion element 130 to rotate.

Referring to FIG. 2A again, in this embodiment, the wavelength conversion element 130 has a wavelength conversion region R. The wavelength conversion material 132 is disposed in an annular form on the surface S1 of the substrate 134 to define the wavelength conversion region R. The wavelength conversion region R includes a first region R1 and a second region R2. The first region R1 occupies ⅚ of the entire wavelength conversion region R and the second region R2 occupies ⅙ of the entire wavelength conversion region R, for example. Nevertheless, the disclosure is not limited thereto, and those skilled in the art may make adjustments according to the design requirements. A concentration of the wavelength conversion material 132 in the first region R1 is greater than a concentration of the wavelength conversion material 132 in the second region R2. In other words, the first region R1 is defined as the region where the wavelength conversion material 132 has a higher concentration, and the second region R2 is defined as the region where the wavelength conversion material 132 has a lower concentration. More specifically, based on unit area, the concentration of the region is defined by the degree of light conversion. When the first excitation beam L1 is transmitted to the first region R1, 98% or more of the first excitation beam L1 is converted by the wavelength conversion material 132 in the first region R1. When the first excitation beam L1 is transmitted to the second region R2, 65% or less of the first excitation beam L1 is converted by the wavelength conversion material 132 in the second region R2. In other embodiments, when the first excitation beam L1 is transmitted to the second region R2, 20% or more of the first excitation beam L1 passes through the second region R2 without being converted by the wavelength conversion material 132 in the second region R2.

In the embodiments of the disclosure, the scattering element 140 is configured to scatter/diffuse a part of the beam passing through the scattering element 140 to change the path of the beam. The scattering element 140 is, for example, a diffusion wheel, a diffusion plate, or an optical element having scattering particles or a scattering structure, but the disclosure is not limited thereto. Referring to FIG. 3, in this embodiment, the scattering element 140 is a diffusion wheel. The scattering element 140 includes a third region R3 and a fourth region R4. The third region R3 of the scattering element 140 is a light-transmissive region to provide a function of light transmission. The fourth region R4 of the scattering element 140 includes scattering particles or scattering structures P to provide a function of scattering a beam. The first excitation beam L1 may be scattered by the scattering particles or the scattering structures P in the fourth region R4 to reduce or eliminate speckles, and if the first excitation beam L1 is a laser beam, the coherence of the laser beam may be destroyed. The third region R3 of the scattering element 140 occupies ⅚ of the entire area of the scattering element 140, for example. The fourth region R4 of the scattering element 140 occupies ⅙ of the entire area of the scattering element 140, for example, but not limited thereto. Those skilled in the art may make adjustments according to the design requirements.

In the embodiments of the disclosure, the light valve (the first light valve 210 and the second light valve 220) refers to any spatial light modulator, such as a digital micro-mirror device (DMD), a liquid-crystal-on-silicon panel (LCOS Panel), or a liquid crystal panel (LCD), but not limited thereto. In this embodiment, the first light valve 210 and the second light valve 220 are digital micro-mirror devices.

In the embodiments of the disclosure, the projection lens 250 is, for example, an optical lens or a combination of multiple optical lenses having refracting power. The optical lens may include various combinations of non-planar lenses, such as biconcave lenses, biconvex lenses, concave convex lenses, convex concave lenses, plano-convex lenses, and plano-concave lenses. The disclosure is not intended to limit the projection lens 250 to certain forms or types.

The filter element 260 in the embodiments of the disclosure generally refers to an optical element that filters out a beam of a specific wavelength range and allows beams other than the beam of the specific wavelength range to pass through. In this embodiment, the filter element 260 is, for example, a red light filter film that filters out a red beam and allows other beams to pass through. In other words, a red beam in the wavelength range of 590 nm to 650 nm is filtered out. Referring to FIG. 3, in this embodiment, the filter element 260 is disposed in the fourth region R4 of the scattering element 140, or as shown in FIG. 1A, the filter element 260 may be disposed on a surface of the scattering element 140 that is opposite to the fourth region R4.

The light combining element 270 in the embodiments of the disclosure generally refers to an optical element that combines one or more beams into one beam, such as a light combining mirror. The light combining element 270 is designed as a light combining element that reflects blue and red beams and allows a green beam to pass through. The light combining element 270 is, for example, a dichroic mirror (DM).

In addition, in this embodiment, one or more mirrors M1 to M3 may be selectively disposed in the illumination system 100, and the mirrors M1 to M3 are configured to adjust the optical path of a part of the first excitation beam L1. An integration rod IR and a first dichroic prism group LA1 and a second dichroic prism group LA2 may be selectively disposed in the projection apparatus 200 to adjust the uniformity of the beam outputted by the illumination system 100 and the path/direction of the beam.

The configuration of the aforementioned elements and the optical behaviors thereof in the projection apparatus 100 are described in detail in the following paragraphs.

First, referring to FIG. 1A and FIG. 1B, the first splitting element 120 is disposed on the transmission paths of the first excitation beam L1, the first conversion beam CL1, and the second conversion beam CL2. The wavelength conversion region R of the wavelength conversion element 130 is disposed on the transmission path of the first excitation beam L1. The scattering element 140 is disposed on the transmission paths of the first excitation beam L1, the first conversion beam CL1, and the second conversion beam CL2. A third splitting element 230 is disposed on transmission paths of the first conversion beam CL1, a part of the second conversion beam CL2, and another part of the first excitation beam L1. The third splitting element 230 splits the first conversion beam CL1 into a first color beam B1 and a second color beam B2. The filter element 260 filters out a wavelength range of a fourth color beam of the second conversion beam CL2, such that a third color beam (green beam) B3 of the second conversion beam CL2 passes through the filter element 260. It is means that the part of the second conversion beam CL2 is the third color beam B3.

The first light valve 210 is disposed on transmission paths of the first color beam B1 and the third color beam B3. The second light valve 220 is disposed on transmission paths of the second color beam B2 and the first excitation beam L1. The first color beam B1 and the third color beam B3 are converted into a first image beam IM1 and a third image beam IM3 by the first light valve 210, and the second color beam B2 and the first excitation beam L1 are converted into a second image beam IM2 and a fourth image beam IM4 by the second light valve 220. The third splitting element 230 is disposed on transmission paths of the first conversion beam CL1, the second conversion beam CL2, and the first excitation beam L1. The fourth splitting element 240 is disposed on transmission paths of the first excitation beam L1 and the second conversion beam CL2. The projection lens 250 is disposed on transmission paths of the first, second, third, and fourth image beams IM1 to IM4. The filter element 260 is disposed on transmission paths of the second conversion beam CL2 and the first excitation beam L1. The light combining element 270 is disposed on transmission paths of the first, second, third, and fourth image beams IM1 to IM4. The mirrors M1 to M3 are disposed on the transmission path of the first excitation beam L1. The integration rod IR is disposed on transmission paths of the first excitation beam L1, the first conversion beam CL1, and the second conversion beam CL2. The first dichroic prism group LA1 is disposed on transmission paths of the first color beam B1 and the third color beam B3. The second dichroic prism group LA2 is disposed on transmission paths of the first excitation beam L1 and the second color beam B2.

The driving element of the wavelength conversion element 130 drives the rotation shaft 136, so as to rotate the first region R1 and the second region R2 to sequentially enter the transmission path of the first excitation beam L1. In this embodiment, the illumination system 100 rotates the wavelength conversion element 130 and the scattering element 140 synchronously, such that the third region R3 of the scattering element 140 corresponds to the first region R1 of the wavelength conversion element 130, and the fourth region R4 of the scattering element 140 corresponds to the second region R2 of the wavelength conversion element 130. More specifically, the beam formed by the first excitation beam L1 applied on the first region R1 correspondingly passes through the third region R3, and the beam formed by the first excitation beam L1 applied on the second region R2 correspondingly passes through the fourth region R4.

Referring to FIG. 1A, FIG. 2A, FIG. 2B, FIG. 3, and FIG. 4, the time interval when the first excitation beam L1 is transmitted to the first region R1 is the first time interval T1. During the first time interval T1, the first excitation beam L1 is emitted from the first excitation light source 110 and reflected by the first splitting element 120 to be transmitted in the direction toward the first region R1 of the wavelength conversion element 130. A major part (98% or more) of the first excitation beam L1 excites the wavelength conversion material 132 in the first region R1 to emit the first conversion beam CL1 (a conversion beam in the wavelength range of 470 nm to 650 nm, which is yellow). The first conversion beam CL1 passes through the first splitting element 120 and the third region R3 of the scattering element 140 to be outputted to the integration rod IR. Therefore, during the first time interval T1, the illumination system 100 outputs the first conversion beam CL1. In this embodiment, the first conversion beam CL1 is uniformized by the integration rod IR and then transmitted to the third splitting element 230. The third splitting element 230 splits the first conversion beam CL1 into the first color beam B1 and the second color beam B2. In this embodiment, the first color beam B1 is a green beam, the first color beam B1 has a wavelength range of 470 nm to 570 nm, the second color beam B2 is a red beam, and the second color beam B2 has a wavelength range of 570 nm to 650 nm. The first color beam B1 is guided to the first light valve 210 by the third splitting element 230 and the first dichroic prism group LA1. The second color beam B2 is guided to the second light valve 220 by the third splitting element 230 and the second dichroic prism group LA2. The first light valve 210 converts the first color beam B1 into the first image beam IM1. The second light valve 220 converts the second color beam B2 into the second image beam IM2. The first image beam IM1 passes through the light combining element 270 and is transmitted to the projection lens 250. The second image beam IM2 is reflected by the light combining element 270 and is transmitted to the projection lens 250. The projection lens 250 then transmits the first image beam IM1 and the second image beam IM2 onto a projection medium (e.g., a projection screen, not shown), so as to form an image. Referring to FIG. 4, therefore, during the first time interval T1, the first light valve 210 may receive the first color beam B1 (green beam), and the second light valve 220 may receive the second color beam B2 (red beam).

Furthermore, referring back to FIG. 3, in other embodiments, a specific coating layer may be applied on the third region R3 of the scattering element 140 for moderately attenuating or filtering out a partial color beam having the wavelength range of 530 nm to 590 nm in the first conversion beam CL1 having the wavelength range of 470 nm to 650 nm, so as to allow the first color beam B1 (green beam) having the wavelength range of 470 nm to 530 nm in the first conversion beam CL1 to pass through the third region R3 of the scattering element 140 and allow the second color beam B2 (red beam) having the wavelength range of 590 nm to 650 nm in the first conversion beam CL1 to pass through the third region R3 of the scattering element 140, such that the color purity (saturation) of the green beam and the red beam is improved.

Referring to FIG. 1B, FIG. 2A, FIG. 2B, FIG. 3, and FIG. 4, the time interval when the first excitation beam L1 is transmitted to the second region R2 is the second time interval T2. The first time interval T1 and the second time interval T2 are two consecutive time intervals, which are defined as a frame F. During the second time interval T2, the first excitation beam L1 is emitted from the first excitation light source 110 and is reflected by the first splitting element 120 to be transmitted in the direction toward the second region R2 of the wavelength conversion element 130. A small part (less than 65%) of the first excitation beam L1 excites the wavelength conversion material 132 in the second region R2 to emit the second conversion beam CL2 (a yellow conversion beam), wherein the first conversion beam CL1 and the second conversion beam CL2 have the same wavelength range. A difference between the first conversion beam CL1 and the second conversion beam CL2 is the light intensity. Since the concentration of the wavelength conversion material 132 in the first region R1 is greater than the concentration of the wavelength conversion material 132 in the second region R2, the light intensity of the first conversion beam CL1 is greater than the light intensity of the second conversion beam CL2. The second conversion beam CL2 is reflected by the fourth splitting element 240 and is transmitted in the direction toward the first splitting element 120. The second conversion beam CL2 passes through the first splitting element 120 and the fourth region R4 of the scattering element 140 to be outputted to the integration rod IR. The filter element 260 is configured to filter out the fourth color beam (e.g., a red beam) in the second conversion beam CL2, and allow the third color beam B3 (e.g., a green beam) in the second conversion beam CL2 to pass through, wherein the fourth color beam has a wavelength range of 570 nm to 650 nm. On the other hand, a major part of the first excitation beam L1 passes through the second region R2 and enters the first splitting element 120 in another direction via the mirrors M1 to M3 and is then reflected by the first splitting element 120 to the fourth region R4 of the scattering element 140. The first excitation beam L1 may be scattered by the scattering particles or the scattering structures P in the fourth region R4 to reduce speckles and be outputted to the integration rod IR. Therefore, during the second time interval T2, the illumination system 100 outputs the first excitation beam L1 and the third color beam B3. Then, after the third color beam B3 is reflected by the third splitting element 230, the third color beam B3 is transmitted to the first light valve 210 via the first dichroic prism group LA1. The first light valve 210 converts the third color beam B3 into the third image beam IM3. The first excitation beam L1 passes through the third color beam B3 and is then transmitted to the second light valve 220 via the second dichroic prism group LA2. The second light valve 220 then converts the first excitation beam L1 into the fourth image beam IM4. The third image beam IM3 passes through the light combining element 270 and is transmitted to the projection lens 250. The fourth image beam IM4 is reflected by the light combining element 270 and transmitted to the projection lens 250. The projection lens 250 then transmits the third image beam IM3 and the fourth image beam IM4 onto a projection medium, so as to form an image. Referring to FIG. 4, therefore, during the second time interval T2, the first light valve 210 may receive the third color beam B3 (green beam) and the second light valve 220 may receive the first excitation beam L1 (blue beam).

Referring to FIG. 1A and FIG. 1B, in this embodiment, the first color beam B1 and the second color beam B2 outputted by the illumination system 100 during the first time interval T1 respectively have the same optical paths as the third color beam B3 and the first excitation beam L1 outputted during the second time interval T2. That is, the first color beam B1 and the third color beam B3 have the same optical path, and the second color beam B2 and the first excitation beam L1 have the same optical path. The first image beam IM1 and the third image beam IM3 have the same optical path, and the second image beam IM2 and the fourth image beam IM4 have the same optical path.

As described above, in the illumination system 100 of this embodiment, the first excitation beam L1 is transmitted to the first region R1 and the second region R2 that have the wavelength conversion material 132 at different concentrations on the wavelength conversion element 130. During the time interval when the first excitation beam L1 is transmitted to the first region R1, the illumination system 100 outputs the first color beam B1 and the second color beam B2. The third splitting element 230 guides the first color beam B1 and the second color beam B2 respectively to the first light valve 210 and the second light valve 220. During the time interval when the first excitation beam L1 is transmitted to the second region R2, the illumination system 100 outputs the third color beam B3 and another part of the first excitation beam L1. The third splitting element 230 guides the third color beam B3 and another part of the first excitation beam L1 respectively to the first light valve 210 and the second light valve 220. Thus, during different time intervals, the first light valve 210 and the second light valve 220 in the projection apparatus 200 both receive beams to generate the corresponding image beams, which prevents the issue that, in the conventional two light valve design, one of the light valves is in an idle state during a certain time interval. Therefore, the projection apparatus 200 of this embodiment achieves favorable optical efficiency (improved brightness) and favorable image quality (colorful image). As compared with the conventional two-light valve design, the disclosure improves the brightness of the image generated by the projection apparatus 200 by 5 to 10%.

Next, referring to FIG. 4, during the first time interval T1, the first light valve 210 receives the first color beam B1 from the first conversion beam CL1, and during the second time interval T2, the first light valve 210 receives the third color beam B3 (green beam) from the second conversion beam CL2. Since the light intensity of the second conversion beam CL2 is lower than the light intensity of the first conversion beam CL1, the light intensity of the third color beam B3 is lower than the light intensity of the first color beam B1. Therefore, the projection apparatus 200 of this embodiment reduces dithering noise and is suitable for processing a dark image, so that the viewer can see the image with high contrast.

It should be noted that some descriptions provided in the previous embodiments also apply to the following embodiments and thus are not repeated hereinafter. Details of elements with the same names have been specified in the previous embodiments and thus repetitive descriptions are omitted.

Figure 5A:
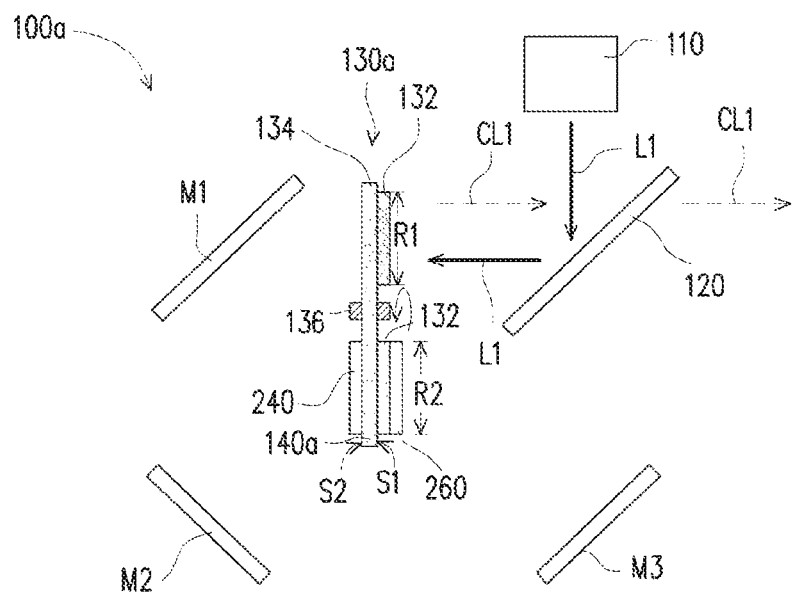
FIG. 5A is a schematic diagram of optical paths of an illumination system during a first time interval according to another embodiment of the disclosure.
Figure 5B:
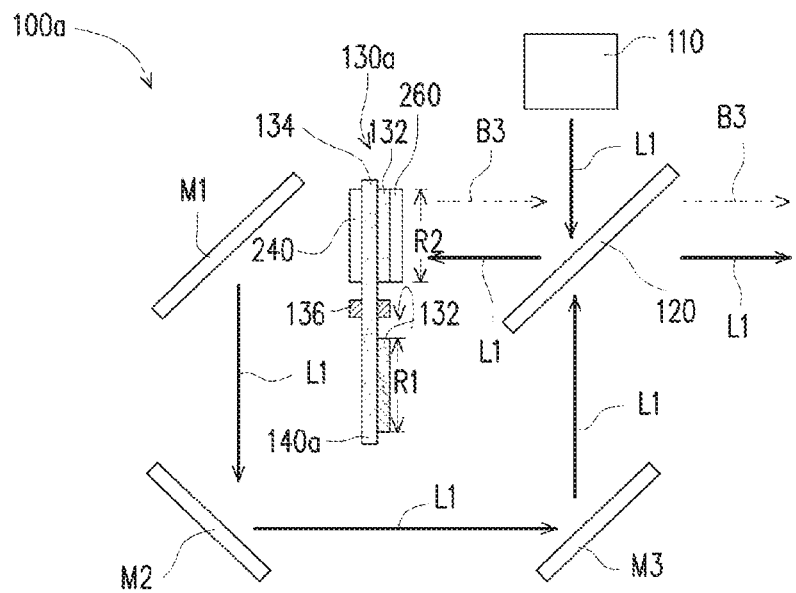
FIG. 5B is a schematic diagram of optical paths of the illumination system in FIG. 5A during a second time interval.
Figure 6A:
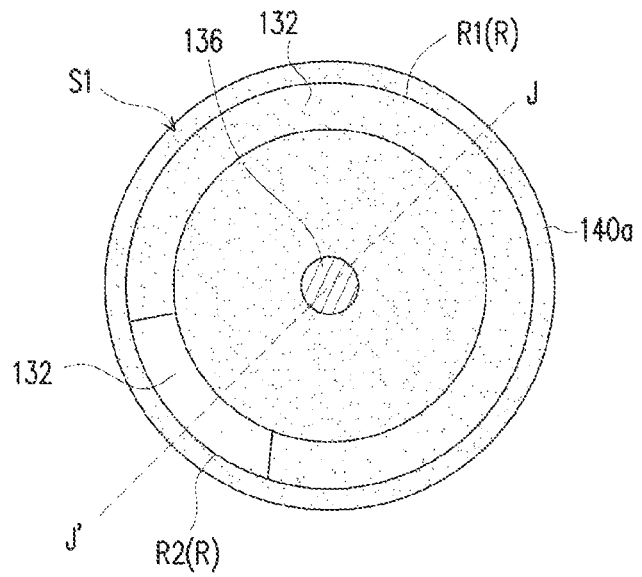
FIG. 6A is a schematic front view of a wavelength conversion element of the illumination system in FIG. 5A.
Figure 6B:
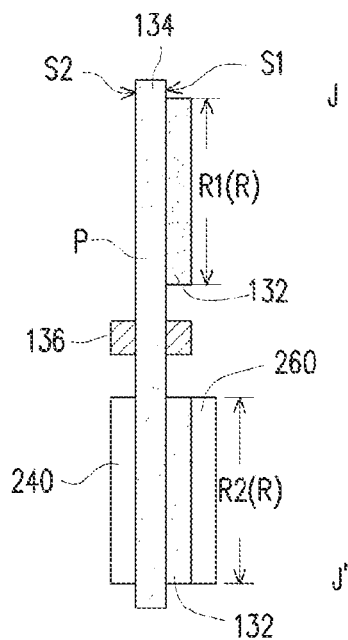
FIG. 6B is a schematic side view of the wavelength conversion element in FIG. 6A.

FIG. 5A is a schematic diagram of optical paths of an illumination system during a first time interval according to another embodiment of the disclosure. FIG. 5B is a schematic diagram of optical paths of the illumination system in FIG. 5A during a second time interval. FIG. 6A is a schematic front view of a wavelength conversion element of the illumination system in FIG. 5A. FIG. 6B is a schematic side view of the wavelength conversion element in FIG. 6A.

Referring to the illumination system 100a of FIG. 5A and FIG. 5B and FIG. 6A and FIG. 6B, a main difference in architecture between the illumination system 100a and the illumination system 100 in FIG. 1A and FIG. 1B is that: in addition to the fourth splitting element 240, the second region R2 of the wavelength conversion element 130a further includes the filter element 260. The fourth splitting element 240 is disposed on the surface S2. The filter element 260 is disposed on the surface S1 opposite to the second region R2. The scattering element 140a is located in the second region R2 of the wavelength conversion element 130 and includes a plurality of scattering particles or scattering structures P.

Next, the optical operation of the illumination system 100a will be described in the following paragraphs.

Referring to FIG. 5A, during the first time interval T1, the illumination system 100a and the illumination system 100 have similar optical behaviors and thus details thereof are not repeated hereinafter. Therefore, during the first time interval T1, the illumination system 100a outputs the first conversion beam CL1.

Referring to FIG. 5B, during the second time interval T2, the first excitation beam L1 is emitted from the first excitation light source 110 and is reflected by the first splitting element 120 to be transmitted in the direction toward the second region R2 of the wavelength conversion element 130. The first excitation beam L1 passes through the filter element 260 and excites the wavelength conversion material 132 in the second region R2 to emit the second conversion beam CL2. After the second conversion beam CL2 is emitted in all directions, a part of the second conversion beam CL2 is first reflected by the fourth splitting element 240 and then transmitted in the direction toward the first splitting element 120. The fourth color beam (red beam) in the second conversion beam CL2 is filtered out by the filter element 260, such that the third color beam B3 passes through the filter element 260. The third color beam B3 then passes through the first splitting element 120 to be outputted from the illumination system 100a. Moreover, another part of the first excitation beam L1 is outputted from the illumination system 100a via the mirrors M1 to M3 and the first splitting element 120. Since another part of the first excitation beam L1 is scattered by the scattering element 140a located in the substrate 134, the coherence of the first excitation beam L1 is destroyed and the speckles caused by the first excitation beam L1 are also reduced. Therefore, during the second time interval T2, the illumination system 100a outputs the first excitation beam L1 and the third color beam B3.

It should be noted that the illumination system 100a in FIG. 5A and FIG. 5B may replace the illumination system 100 in FIG. 1A and FIG. 1B to output the beams to the first light valve 210 and the second light valve 220 during the first time interval T1 and the second time interval T2. The illumination system 100a outputs the beams during the first time interval T1 and the second time interval T2 in a manner similar to the illumination system 100 and thus details thereof are not repeated hereinafter.

In the illumination system 100a of this embodiment, the scattering element 140a is located in the wavelength conversion element 130, and thus the function of scattering and the function of wavelength conversion are integrated in the wavelength conversion element 130. In comparison with the illumination system 100, the illumination system 100a of this embodiment provides similar functions without a diffusion wheel. Thus, the projection apparatus 200 is smaller in size.

Figure 7A:
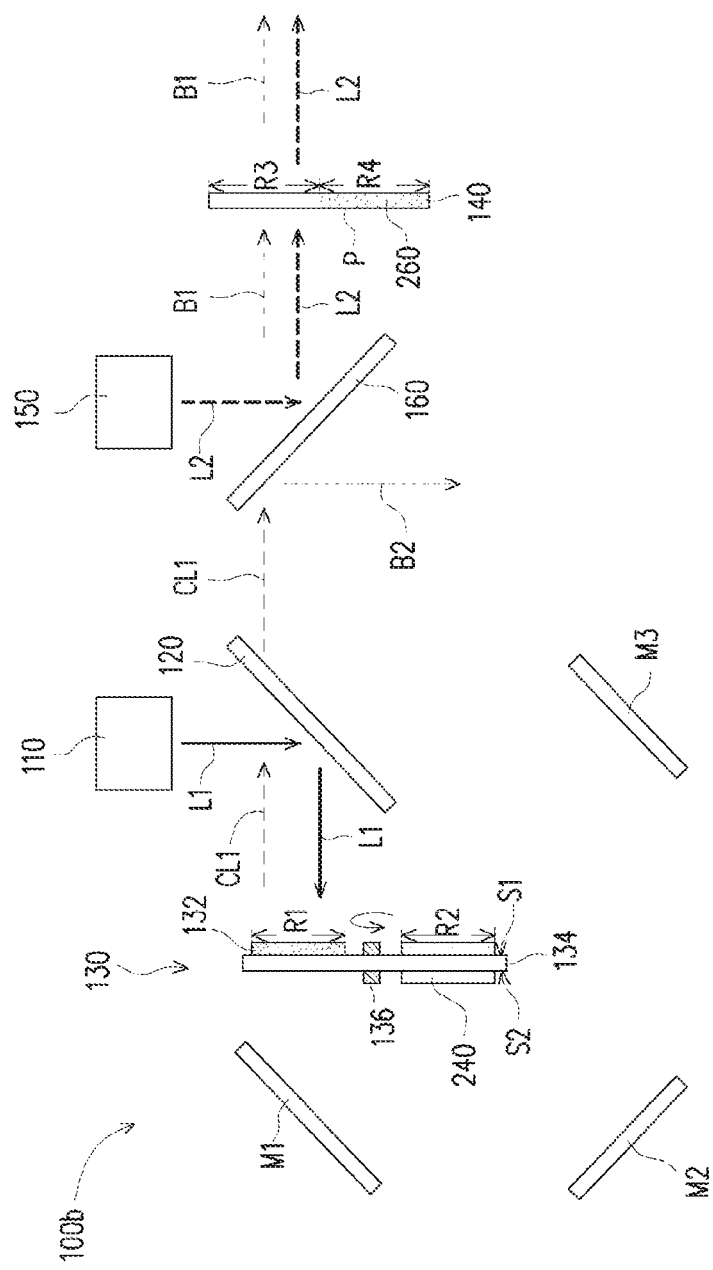
FIG. 7A is a schematic diagram of optical paths of an illumination system during a first time interval according to another embodiment of the disclosure.
Figure 7B:
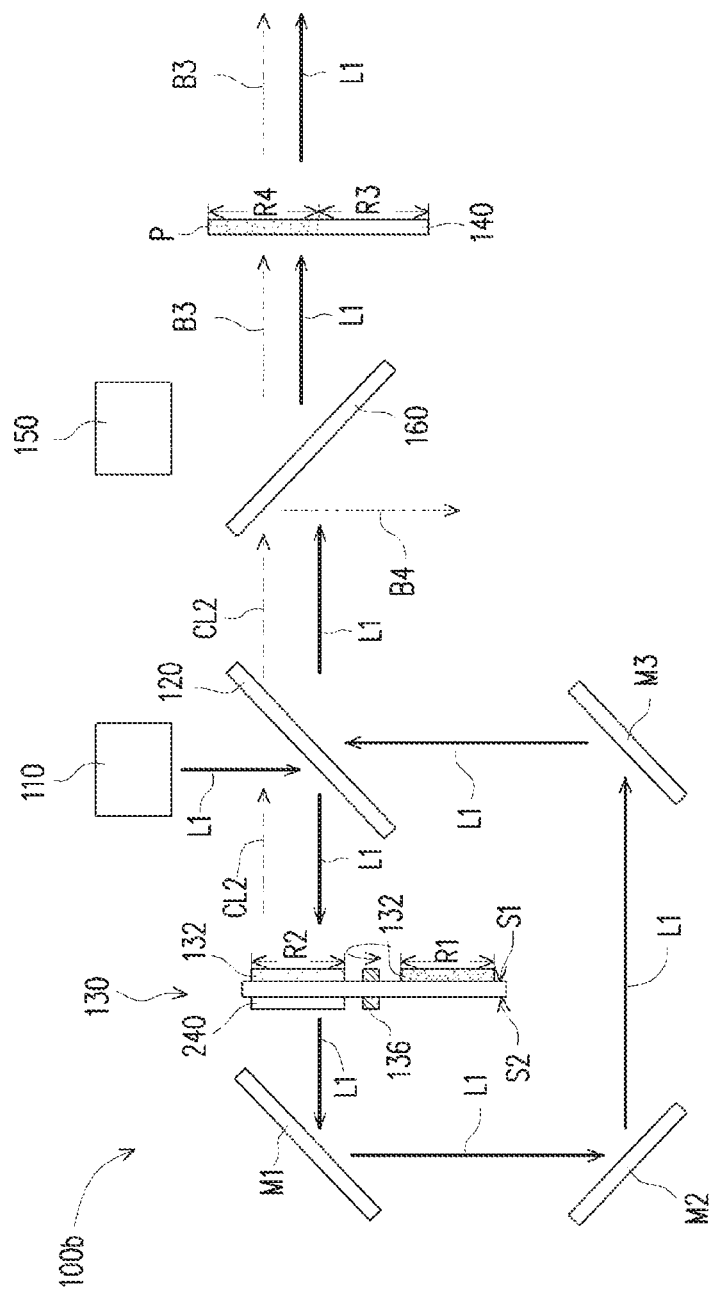
FIG. 7B is a schematic diagram of optical paths of the illumination system in FIG. 7A during a second time interval.
Figure 7C:
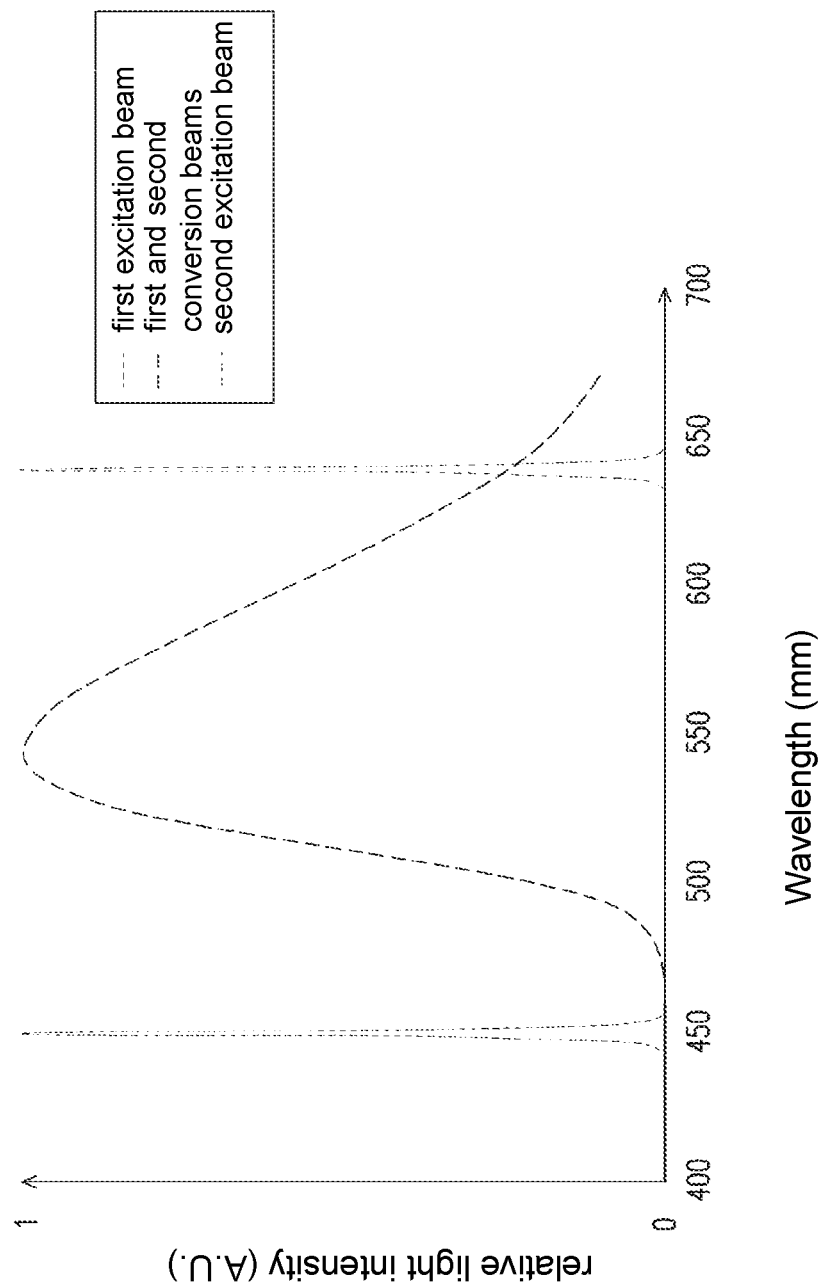
FIG. 7C is a graph showing the relationship between the wavelengths and relative light intensities of a first excitation beam, a second beam, a first conversion beam, and a second conversion beam in FIG. 7A and FIG. 7B.
Figure 7D:
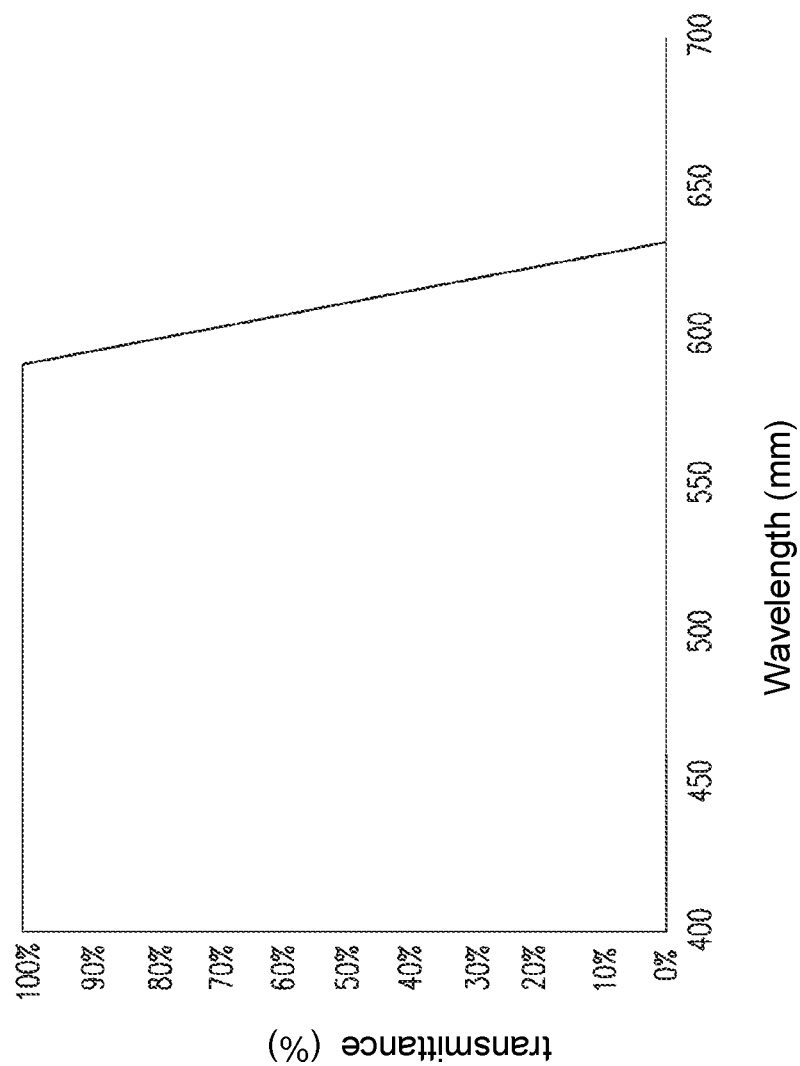
FIG. 7D is a graph showing the relationship between the wavelength and transmittance of a second splitting element in FIG. 7A and FIG. 7B.

FIG. 7A is a schematic diagram of optical paths of an illumination system during a first time interval according to another embodiment of the disclosure. FIG. 7B is a schematic diagram of optical paths of the illumination system in FIG. 7A during a second time interval. FIG. 7C is a graph showing the relationship between the wavelengths and relative light intensities of a first excitation beam, a second beam, a first conversion beam, and a second conversion beam in FIG. 7A and FIG. 7B. FIG. 7D is a graph showing the relationship between the wavelength and transmittance of a second splitting element in FIG. 7A and FIG. 7B.

Referring to the illumination system 100b of FIG. 7A and FIG. 7B, a main difference in architecture between the illumination system 100b and the illumination system 100 in FIG. 1A and FIG. 1B is that: the illumination system 100b further includes a second light source 150 and the second splitting element 160. The second light source 150 is similar to the first excitation light source 110, and a main difference is that: the second light source 150 is configured to emit a second beam L2. In this embodiment, the second light source 150 is, for example, a red laser light emitting diode or a light emitting diode, but not limited thereto. Referring to FIG. 7C, the second beam L2 is, for example, a red laser beam, and has a red light spectrum. The second beam L2 has a peak wavelength in a range of 620 nm to 750 nm. The second beam L2 and the second color beam B2 have similar wavelength ranges. Therefore, the second beam L2 may replace the second color beam B2, such that the illumination system 100b of FIG. 7A and FIG. 7B may output the first color beam B1, the second beam L2, the third color beam B3, and the first excitation beam L1. An emitting direction of the first excitation beam L1 is the same as an emitting direction of the second beam L2. The second splitting element 160 is disposed on the transmission path of the first excitation beam L1, the second beam L2, the first conversion beam CL1, and the second conversion beam CL2. The second splitting element 160 is configured to reflect the second beam L2 and allow a part of the first conversion beam CL1, the second conversion beam CL2, and the first excitation beam L1 to pass through. Referring to FIG. 7D, the second splitting element 160 is, for example, designed as a splitting element that allows blue and green beams to pass through and reflects the red beam. The scattering element 140 is disposed on the transmission path of the second beam L2.

Next, the optical behavior of the illumination system 100b will be described in the following paragraphs.

Referring to FIG. 7A, during the first time interval T1, the first excitation beam L1 is transmitted to the first region R1, such that the wavelength conversion material 132 in the first region R1 emits the first conversion beam CL1. The first conversion beam CL1 passes through the first splitting element 120 to be transmitted to the second splitting element 160. The first color beam B1 (green beam) in the first conversion beam CL1 passes through the second splitting element 160. The second color beam B2 (red beam) in the first conversion beam CL1 is reflected by the second splitting element 160. The second beam L2 is reflected by the second splitting element 160 and transmitted to the third region R3 of the scattering element 140. Therefore, during the first time interval T1, the illumination system 100b outputs the first color beam B1 in the first conversion beam CL1 and the second beam L2. The second beam L2 serves as the second color beam B2. The third region R3 of the scattering element 140 may include scattering particles or scattering structures P, so as to destroy the coherence of the second excitation beam L2 and reduce the speckles caused by the second excitation beam L2.

Referring to FIG. 7B, during the second time interval T2, the first excitation beam L1 is emitted by the first excitation light source 110 and reflected by the first splitting element 120 and transmitted to the wavelength conversion element 130. A part of the first excitation beam L1 is used to excite the wavelength conversion material 132 in the second region R2 to emit the second conversion beam CL2. The fourth splitting element 240 reflects and transmits the second conversion beam CL2 to the first splitting element 120. The second conversion beam CL2 passes through the first splitting element 120 to be transmitted to the second splitting element 160. The second splitting element 160 then reflects the fourth color beam B4 (red beam) in the second conversion beam CL2 and allows the third color beam B3 (green beam) in the second conversion beam CL2 to pass through. Furthermore, another part of the first excitation beam L1 passes through the second region R2, and then sequentially passes through the mirrors M1 to M3, the first splitting element 120, the second splitting element 160, and the fourth region R4 of the scattering element 140 to be outputted from the illumination system 100b. The second light source 150 stops emitting the second beam L2. Therefore, during the second time interval T2, the illumination system 100b outputs the first excitation beam L1 and the third color beam B3.

It should be noted that the illumination system 100b in FIG. 7A and FIG. 7B may replace the illumination system 100 in FIG. 1A and FIG. 1B to output the beams to the first light valve 210 and the second light valve 220 during the first time interval T1 and the second time interval T2. Referring to FIG. 1A and FIG. 1B again, the illumination system 100b outputs the first color beam B1 and the second beam L2 during the first time interval T1 in a manner similar to the first color beam B1 and the second color beam B2 in FIG. 1A and FIG. 1B respectively. Specifically, the second light valve 220 is disposed on the transmission path of the second beam L2 and converts the second beam L2 into a fifth image beam IM5. The projection lens 250 is disposed on the transmission path of the fifth image beam IM5. That is, the second color beam B2 and the second beam L2 in FIG. 1A have the same optical path. The second image beam IM2 in FIG. 1A and the fifth image beam IM5 have the same optical path. The illumination system 100b outputs the third color beam B3 and the first excitation beam L1 during the second time interval T2 in a manner similar to the third color beam B3 and the first excitation beam L1 in FIG. 1A and FIG. 1B respectively, and thus details thereof are not repeated hereinafter.

In the illumination system 100b of this embodiment, the light intensity of the second beam L2 (red beam) is greater than the light intensity of the second color beam B2 (red beam) divided from the first conversion beam CL1. Therefore, when the illumination system 100 in the projection apparatus 200 is replaced by the illumination system 100b of FIG. 7A and FIG. 7B, the light intensity of the fifth image beam IM5 converted by the second light valve 220 during the first time interval T1 is greater than the light intensity of the second image beam IM2. The overall brightness of the image projected by the projection apparatus using the illumination system 100b during the first time interval T1 is improved.

Figure 8A:
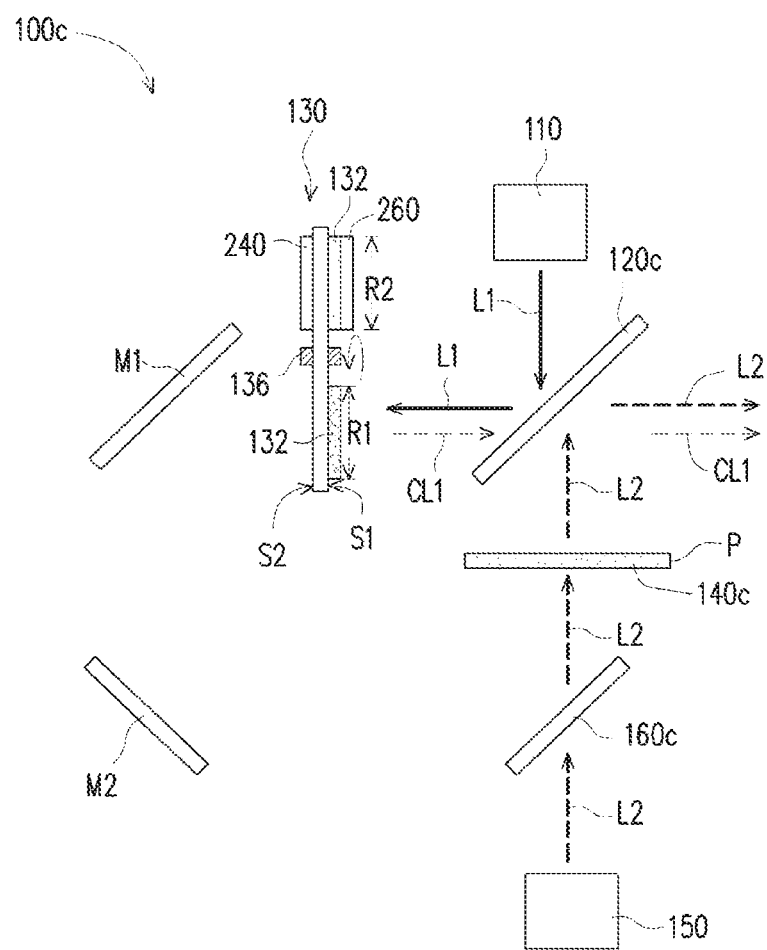
FIG. 8A is a schematic diagram of optical paths of an illumination system during a first time interval according to another embodiment of the disclosure.
Figure 8B:
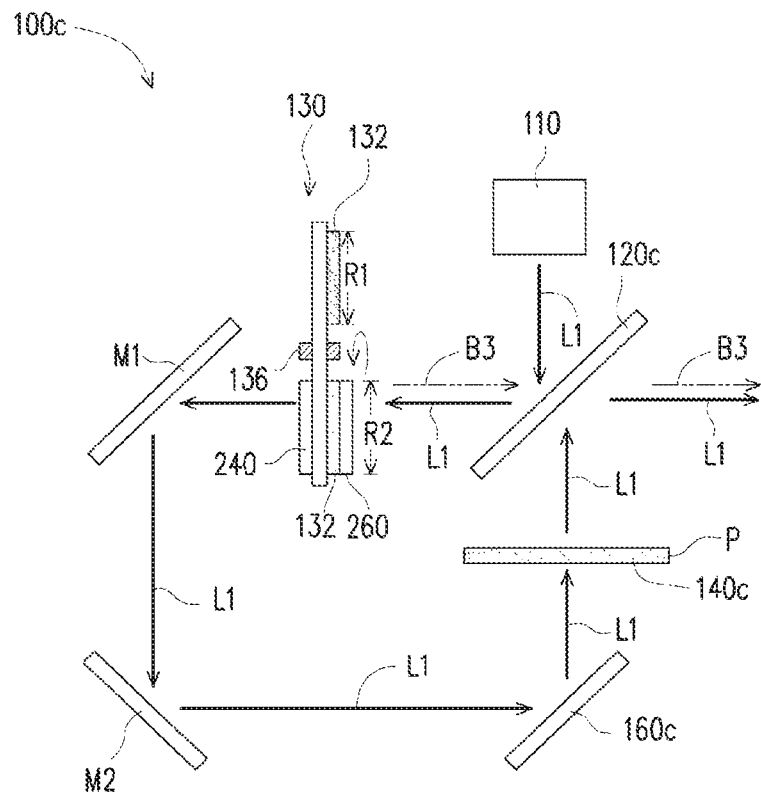
FIG. 8B is a schematic diagram of optical paths of the illumination system in FIG. 8A during a second time interval.
Figure 8C:
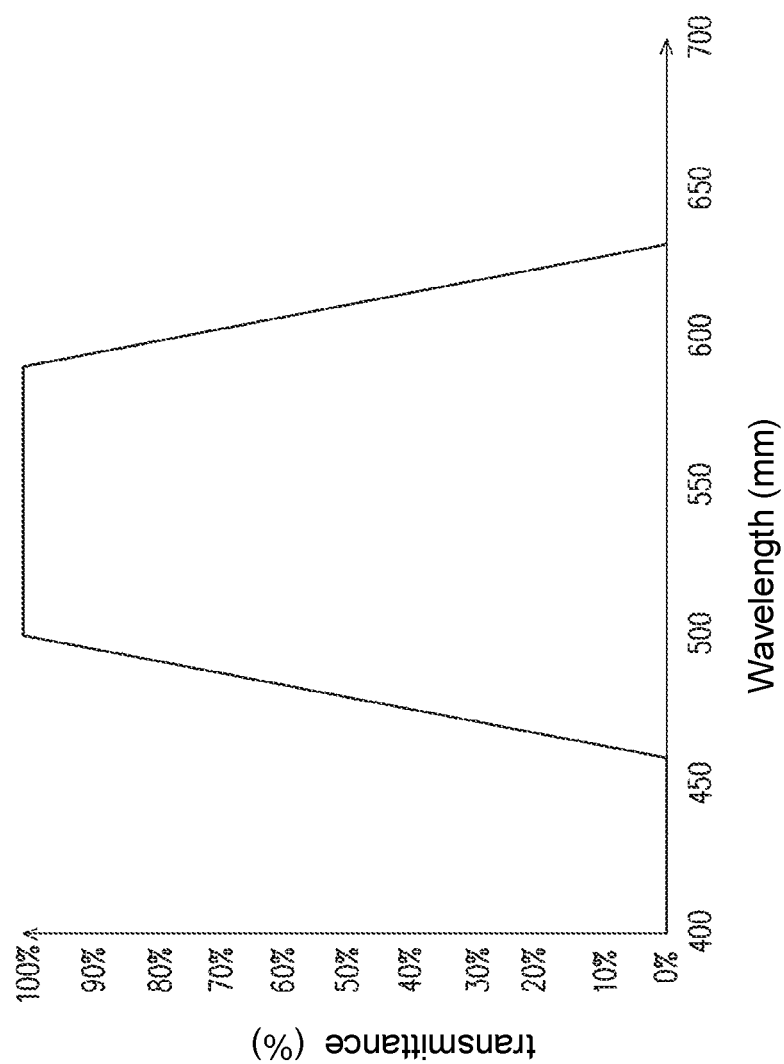
FIG. 8C is a graph showing the relationship between the wavelength and transmittance of a first splitting element in FIG. 8A and FIG. 8B.
Figure 8D:
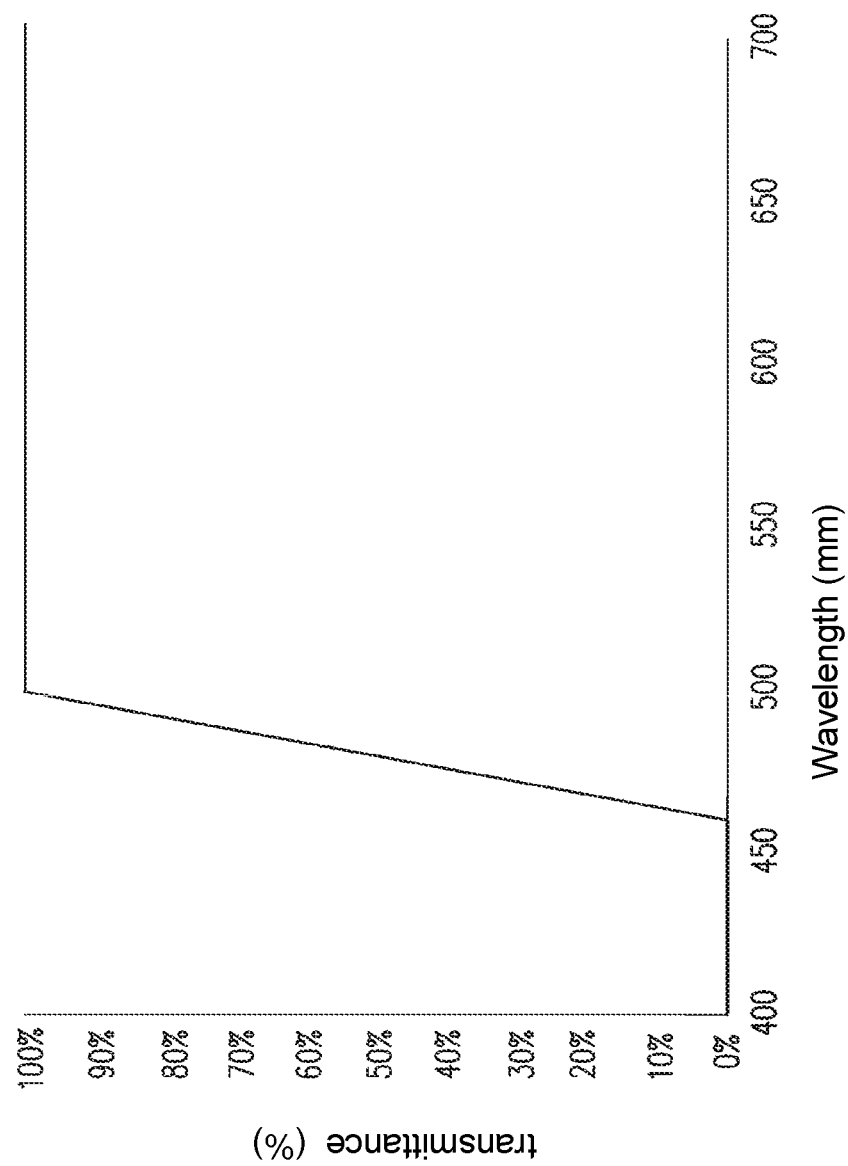
FIG. 8D is a graph showing the relationship between the wavelength and transmittance of a second splitting element in FIG. 8A and FIG. 8B.
Figure 9A:
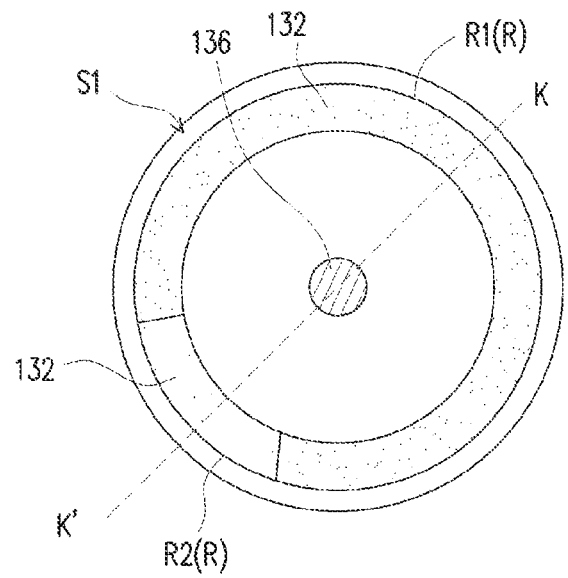
FIG. 9A is a schematic front view of a wavelength conversion element of the illumination system in FIG. 8A.
Figure 9B:
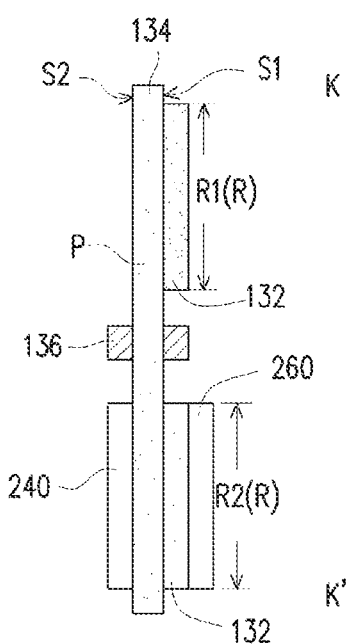
FIG. 9B is a schematic side view of the wavelength conversion element in FIG. 9A.
Figure 10:
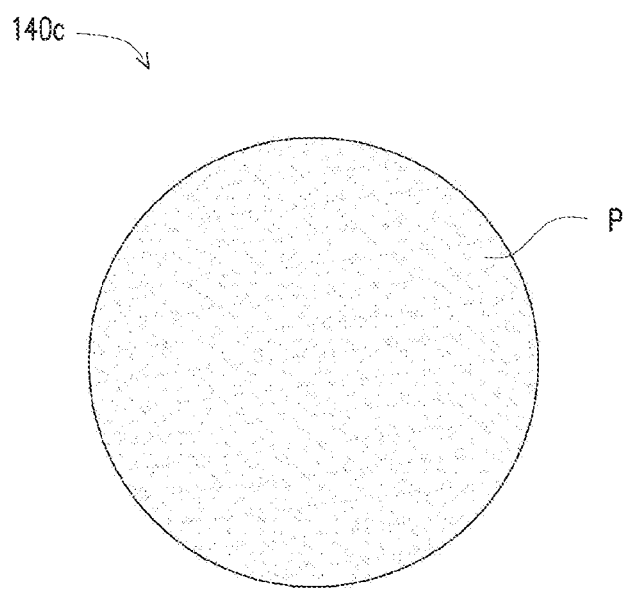
FIG. 10 is a schematic front view of a scattering element of the illumination system in FIG. 8A and FIG. 8B.

FIG. 8A is a schematic diagram of optical paths of an illumination system during a first time interval according to another embodiment of the disclosure. FIG. 8B is a schematic diagram of optical paths of the illumination system in FIG. 8A during a second time interval. FIG. 8C is a graph showing the relationship between the wavelength and transmittance of a first splitting element in FIG. 8A and FIG. 8B. FIG. 8D is a graph showing the relationship between the wavelength and transmittance of a second splitting element in FIG. 8A and FIG. 8B. FIG. 9A is a schematic front view of a wavelength conversion element of the illumination system in FIG. 8A. FIG. 9B is a schematic side view of the wavelength conversion element in FIG. 9A. FIG. 10 is a schematic front view of a scattering element of the illumination system in FIG. 8A and FIG. 8B.

Referring to the illumination system 100c of FIG. 8A and FIG. 8B, a main difference in architecture between the illumination system 100c and the illumination system 100b in FIG. 7A and FIG. 7B is that: the first excitation light source 110 and the second light source 150 are disposed opposite to each other, such that the emitting direction of the first excitation beam L1 is opposite to the emitting direction of the second beam L2. The position of the second splitting element 160c replaces the position of the mirror M3. Referring to FIG. 9A and FIG. 9B, the second region R2 of the wavelength conversion element 130c includes the fourth splitting element 240 and the filter element 260. The fourth splitting element 240 is disposed on the surface S2. The filter element 260 is disposed on the second region R2 and the surface S1. The scattering element 140c is disposed between the first splitting element 120c and the second splitting element 160c. Referring to FIG. 10, the scattering particles or the scattering structures P in the scattering element 140c are uniformly distributed. The second splitting element 160c is configured to reflect the first excitation beam L1 and allow the second beam L2 to pass through. Referring to FIG. 8C, that is, the first splitting element 120c is designed as a splitting element that reflects blue and red beams and allows the green beam to pass through. Referring to FIG. 8D, the second splitting element 160c is designed as a splitting element that reflects the blue beam and allows the red beam to pass through.

Next, the optical operation of the illumination system 100c will be described in the following paragraphs.

Referring to FIG. 8A, during the first time interval T1, the first excitation beam L1 is transmitted to the first region R1 via the first splitting element 120c, such that the wavelength conversion material 132 in the first region R1 emits the first conversion beam CL1. The second color beam B2 in the first conversion beam CL1 is reflected by the first splitting element 120c and the first color beam B1 in the first conversion beam CL1 passes through the first splitting element 120c. In addition, the second light source 150 emits the second beam L2. The second beam L2 sequentially passes through the second splitting element 160c and the scattering element 140c and is reflected by the first splitting element 120c. Therefore, during the first time interval T1, the illumination system 100c outputs the first conversion beam CL1 and the second beam L2. The second beam L2 serves as the second color beam B2.

Referring to FIG. 8B, during the second time interval T2, the first excitation beam L1 is emitted by the first excitation light source 110 and transmitted to the second region R2 via the first splitting element 120c, and a part of the first excitation beam L1 excites the wavelength conversion material 132 in the second region R2 to emit the second conversion beam CL2. The fourth splitting element 240 reflects the second conversion beam CL2. The fourth color beam (red beam) in the second conversion beam CL2 is filtered out by the filter element 260, and the third color beam B3 (green beam) is allowed to pass through the filter element 260. The third color beam B3 passes through the first splitting element 120 to be outputted from the illumination system 100c. Furthermore, another part of the first excitation beam L1 is outputted from the illumination system 100c via the mirrors M1 and M2, the second splitting element 160c, the scattering element 140c, and the first splitting element 120. The second light source 150 stops emitting the second beam L2. Therefore, during the second time interval T2, the illumination system 100c outputs the third color beam B3 and the first excitation beam L1.

It should be noted that the illumination system 100c in FIG. 8A and FIG. 8B may replace the illumination system 100 in FIG. 1A and FIG. 1B to output the beams to the first light valve 210 and the second light valve 220 during the first time interval T1 and the second time interval T2. The illumination system 100c outputs the beams during the first time interval T1 and the second time interval T2 in a manner similar to the illumination system 100b in FIG. 7A and FIG. 7B and thus details thereof are not repeated hereinafter.

Figure 11A:
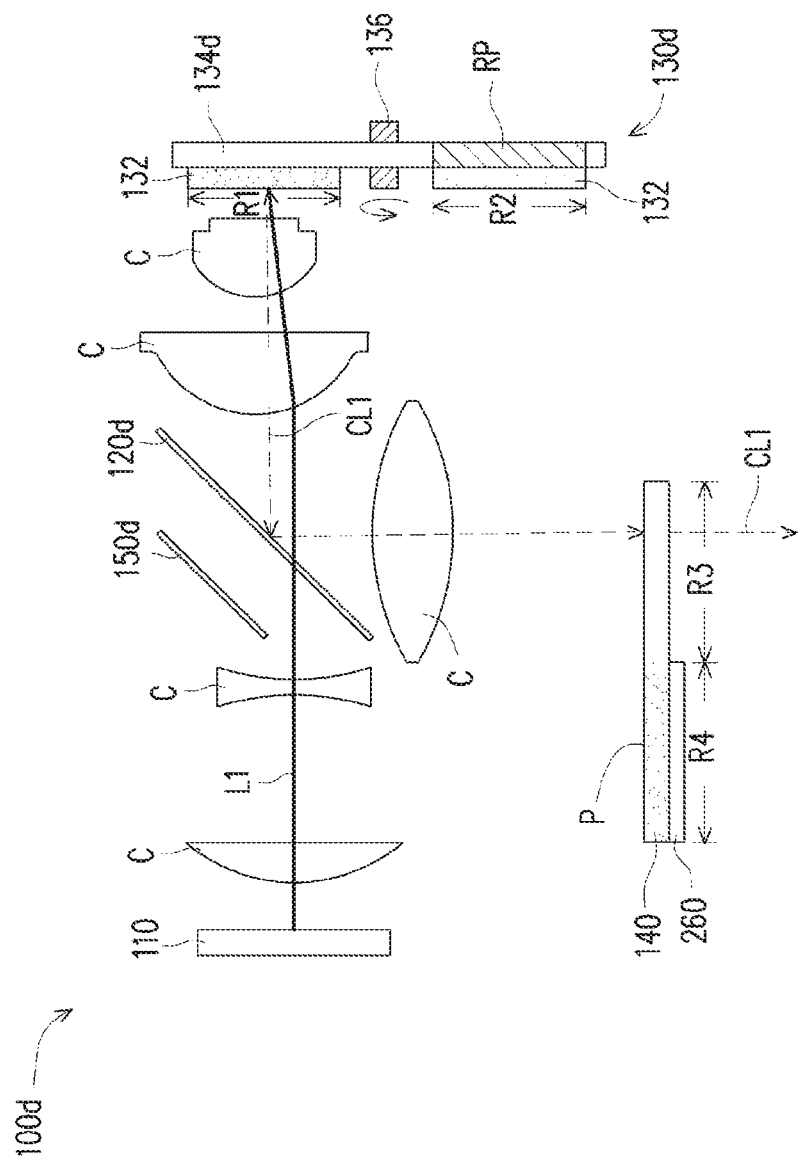
FIG. 11A is a schematic diagram of optical paths of an illumination system during a first time interval according to another embodiment of the disclosure.
Figure 11B:
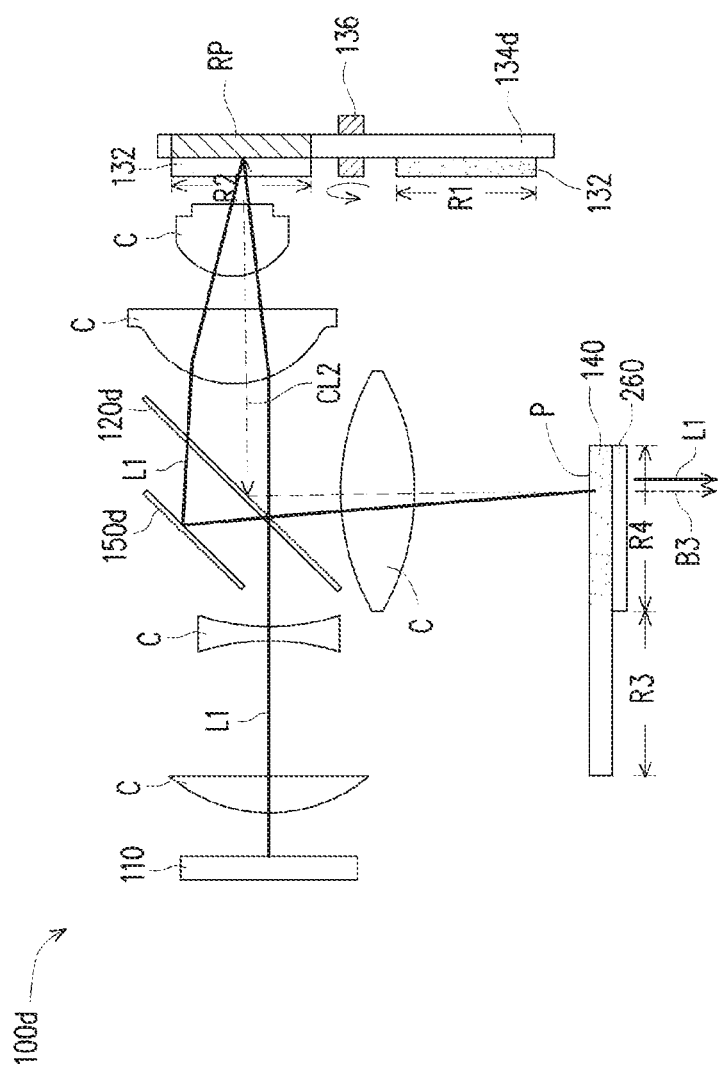
FIG. 11B is a schematic diagram of optical paths of the illumination system in FIG. 11A during a second time interval.
Figure 12A:
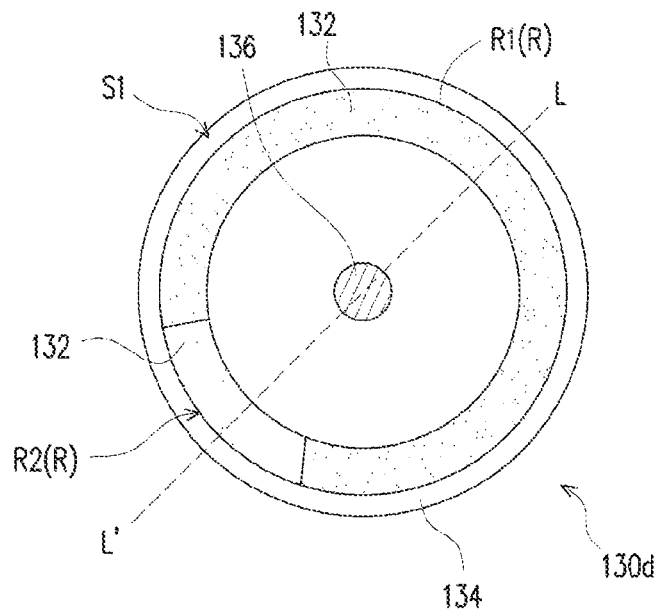
FIG. 12A is a schematic front view of a wavelength conversion element of the illumination system in FIG. 11A and FIG. 11B.
Figure 12B:
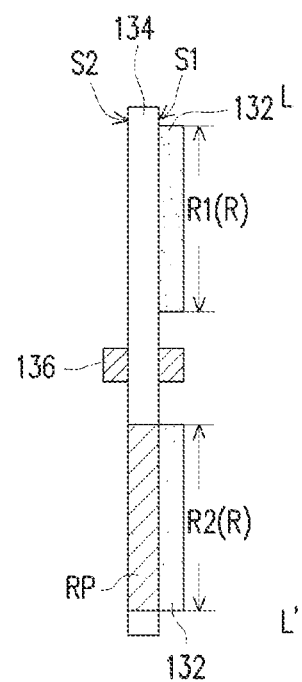
FIG. 12B is a schematic side view of the wavelength conversion element in FIG. 12A.

FIG. 11A is a schematic diagram of optical paths of an illumination system during a first time interval according to another embodiment of the disclosure. FIG. 11B is a schematic diagram of optical paths of the illumination system in FIG. 11A during a second time interval. FIG. 12 is a schematic front view of a wavelength conversion element of the illumination system in FIG. 11A and FIG. 11B.

Referring to the illumination system 100d of FIG. 11A and FIG. 11B, a main difference in architecture between the illumination system 100d and the illumination system 100 in FIG. 1A and FIG. 1B is that: the illumination system 100d includes the first excitation light source 110, the first splitting element 120d, the wavelength conversion element 130d, a reflective element 150d, the scattering element 140, and a plurality of lenses C respectively having refracting power. The first splitting element 120d is designed as a splitting element that reflects a yellow beam (including the wavelength ranges of green and red beams) and allows the blue beam to pass through. The reflective element 150d is a mirror, for example, and the reflective element 150d is designed to reflect the blue beam. The wavelength conversion element 130d is a reflective phosphor wheel. Specifically, the wavelength conversion element 130d is substantially similar to the wavelength conversion element 130, and a main difference is that: the substrate 134d of the wavelength conversion element 130d includes a reflective part RP. The second region R2 of the wavelength conversion region R is located on the reflective part RP.

Referring to FIG. 11A, during the first time interval T1, the first excitation beam L1 is emitted from the first excitation light source 110 and passes through the first splitting element 120d to be transmitted to the first region R1 of the wavelength conversion element 130d. The wavelength conversion material 132 in the first region R1 is excited by the first excitation beam L1 to emit the first conversion beam CL1. The first conversion beam CL1 is reflected by the first splitting element 120*d* and is transmitted to the third region R3 of the scattering element 140 to be outputted from the illumination system 100*d*. Therefore, during the first time interval T1, the illumination system 100*d* outputs the first conversion beam CL1, and the green beam and the red beam in the first conversion beam CL1 serve as the first color beam B1 and the second color beam B2 respectively.

Referring to FIG. 11B, during the second time interval T2, the first excitation beam L1 is emitted from the first excitation light source 110 and passes through the first splitting element 120*d* to be transmitted to the second region R2 of the wavelength conversion element 130*d*. A part of the first excitation beam L1 excites the wavelength conversion material 132 in the second region R2 to emit the second conversion beam CL2. The second conversion beam CL2 is reflected by the reflective part RP and is transmitted to the first splitting element 120*d*. The second conversion beam CL2 is reflected by the first splitting element 120*d* and is transmitted to the fourth region R4 of the scattering element 140. The filter element 260 filters out the fourth color beam (red beam) in the second conversion beam CL2 and allows the third color beam B3 (green beam) to pass through. The illumination system 100*d* outputs the third color beam B3. Another part of the first excitation beam L1 is reflected by the reflective part RP to pass through the first splitting element 120*d* and is reflected by the reflective element 150*d* to be transmitted to the fourth region R4 of the scattering element 140, so as to be outputted from the illumination system 100*d*. Therefore, during the second time interval T2, the illumination system 100*d* outputs the third color beam B3 and the first excitation beam L1.

It should be noted that the illumination system 100*d* in FIG. 11A and FIG. 11B may replace the illumination system 100 in FIG. 1A and FIG. 1B to output the beams to the first light valve 210 and the second light valve 220 during the first time interval T1 and the second time interval T2. The illumination system 100*d* outputs the beams during the first time interval T1 and the second time interval T2 in a manner similar to the illumination system 100 and thus details thereof are not repeated hereinafter.

To sum up, in the illumination system according to the embodiments of the disclosure, the first excitation beam is transmitted to the first region and the second region that have the wavelength conversion material at different concentrations on the wavelength conversion element. Thus, during the time interval when the first excitation beam is transmitted to the first region, the illumination system outputs the first color beam and the second color beam. The third splitting element guides the first color beam and the second color beam respectively to the first light valve and the second light valve. During the time interval when the first excitation beam is transmitted to the second region, the illumination system outputs the first excitation beam and the third color beam, and the third splitting element guides the third color beam and the first excitation beam respectively to the first light valve and the second light valve. Therefore, during different time intervals, the first light valve and the second light valve both receive beams to generate the corresponding image beams, which prevents the issue that, in the related art, the light valve is in an idle state. Thus, the projection apparatus of the embodiments of the disclosure achieves favorable optical efficiency and favorable image quality.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. An illumination system, comprising:
   a first excitation light source configured to emit a first excitation beam;
   a wavelength conversion element comprising a wavelength conversion material and the wavelength conversion element having a first region and a second region, wherein a concentration of the wavelength conversion material in the first region is greater than a concentration of the wavelength conversion material in the second region, and the first region and the second region sequentially enter into a transmission path of the first excitation beam,
   wherein the first excitation beam is transmitted to the first region and the first excitation beam excites the wavelength conversion material in the first region to emit a first conversion beam, and
   the first excitation beam is transmitted to the second region and a part of the first excitation beam excites the wavelength conversion material in the second region to emit a second conversion beam, and a different part of the first excitation beam passes through the second region; and
   a scattering element, disposed on the transmission path of the first excitation beam, wherein the illumination system outputs the first conversion beam, a part of the second conversion beam, and the different part of the first excitation beam.

2. The illumination system according to claim 1, wherein a time interval when the first excitation beam is transmitted to the first region is a first time interval, a time interval when the first excitation beam is transmitted to the second region is a second time interval, and the first time interval and the second time interval are two consecutive time intervals.

3. The illumination system according to claim 1, wherein the first conversion beam passes through the scattering element.

4. The illumination system according to claim 1, wherein the scattering element is disposed on a transmission path of the first conversion beam and the second conversion beam, the scattering element further comprises a third region and a fourth region, the third region of the scattering element corresponds to the first region of the wavelength conversion element, the fourth region of the scattering element corresponds to the second region of the wavelength conversion element, wherein the third region of the scattering element is a light-transmissive region, the fourth region of the scattering element comprises scattering particles or scattering structures, and the scattering element further comprises a filter element configured to filter out a wavelength range of a fourth color beam of the second conversion beam.

5. The illumination system according to claim 4, wherein a coating layer is disposed in the third region to attenuate or filter out a beam having a wavelength range of 530 nm to 590 nm in the first conversion beam.

6. The illumination system according to claim 1, wherein the scattering element is disposed on transmission paths of the first conversion beam and of the second conversion beam, and the scattering element is located on the wavelength conversion element, wherein a fourth splitting element and a filter element are further disposed in the second region of the wavelength conversion element, and the fourth splitting element is configured to reflect the second conversion beam, wherein the filter element is configured to filter out a wavelength range of a fourth color beam of the second conversion beam.

7. The illumination system according to claim 1, wherein a filter element is further disposed in the second region of the wavelength conversion element, wherein the filter element is configured to filter out a wavelength range of a fourth color beam of the second conversion beam.

8. The illumination system according to claim 1, wherein the illumination system further comprises a first splitting element disposed on a transmission path of the first excitation beam, the first conversion beam, and the second conversion beam, wherein the first splitting element is configured to reflect the first excitation beam and allow the first conversion beam and the second conversion beam to pass through.

9. The illumination system according to claim 1, wherein the illumination system further comprises a second light source and a second splitting element, the second light source emits a second beam as a second color beam, the scattering element is disposed on a transmission path of the second beam, and the second splitting element is disposed on transmission paths of the second beam and of the first excitation beam, wherein when the first excitation beam is transmitted to the first region, the second light source emits the second beam, and when the first excitation beam is transmitted to the second region, the second light source stops emitting the second beam.

10. The illumination system according to claim 9, wherein the second splitting element is disposed on transmission paths of the first conversion beam and of the second conversion beam and configured to reflect the second beam and allow a part of the first conversion beam, the second conversion beam, and the first excitation beam to pass through.

11. The illumination system according to claim 10, wherein an emitting direction of the first excitation beam is the same as an emitting direction of the second beam.

12. The illumination system according to claim 9, wherein the second splitting element is disposed between the second light source and the scattering element, and the second splitting element is configured to reflect the first excitation beam and allow the second beam to pass through.

13. The illumination system according to claim 12, wherein an emitting direction of the first excitation beam is opposite to an emitting direction of the second beam.

14. The illumination system according to claim 9, wherein the second beam is a red beam.

15. The illumination system according to claim 1, wherein the first excitation beam is a laser beam having a blue wavelength range, and the first conversion beam and the second conversion beam are conversion beams having a yellow wavelength range.

16. The illumination system according to claim 1, wherein the first excitation beam is transmitted to the second region and the different part of the first excitation beam passes through the wavelength conversion element.

17. The illumination system according to claim 1, wherein the first excitation beam is transmitted to the second region and the different part of the first excitation beam is reflected by the wavelength conversion element.

18. A projection apparatus, comprising:
an illumination system comprising:
a first excitation light source configured to emit a first excitation beam;
a wavelength conversion element comprising a wavelength conversion material and the wavelength conversion element having a first region and a second region,
wherein a concentration of the wavelength conversion material in the first region is greater than a concentration of the wavelength conversion material in the second region, and the first region and the second region sequentially enter into a transmission path of the first excitation beam,
wherein the first excitation beam is transmitted to the first region and the first excitation beam excites the wavelength conversion material in the first region to emit a first conversion beam, and
the first excitation beam is transmitted to the second region and a part of the first excitation beam excites the wavelength conversion material in the second region to emit a second conversion beam, and a different part of the first excitation beam passes through the second region;
a scattering element, disposed on the transmission path of the first excitation beam, wherein the illumination system outputs the first conversion beam, a part of the second conversion beam, and the different part of the first excitation beam;
a third splitting element is disposed on transmission paths of the first conversion beam, the part of the second conversion beam, and the different part of the first excitation beam, wherein the third splitting element splits the first conversion beam into a first color beam and a second color beam, and the part of the second conversion beam is a third color beam;
a first light valve is disposed on transmission paths of the first color beam and of the third color beam, the first light valve converts the first color beam into a first image beam or converts the third color beam into a third image beam, wherein the third splitting element guides the first color beam or the third color beam to the first light valve;
a second light valve is disposed on transmission paths of the second color beam and of the different part of the first excitation beam, the second light valve converts the second color beam into a second image beam or converts the different part of the first excitation beam into a fourth image beam, wherein the third splitting element guides the second color beam or the different part of the first excitation beam to the second light valve; and
a projection lens is disposed on transmission paths of the first image beam, the second image beam, the third image beam, and the fourth image beam.

19. The projection apparatus according to claim 18, wherein the first conversion beam passes through the scattering element.

20. The projection apparatus according to claim 18, wherein the scattering element is disposed on transmission paths of the first conversion beam and of the second conversion beam, the scattering element further comprises a third region and a fourth region, the third region of the scattering element corresponds to the first region of the wavelength conversion element, the fourth region of the scattering element corresponds to the second region of the wavelength conversion element, wherein the third region of the scattering element is a light-transmissive region, the fourth region of the scattering element comprises scattering particles or scattering structures, and the scattering element further comprises a filter element disposed on a transmission path of the second conversion beam and configured to filter out a wavelength range of a fourth color beam of the second conversion beam and allow the third color beam of the second conversion beam to pass through.

21. The projection apparatus according to claim 18, wherein the scattering element is disposed on transmission paths of the first conversion beam and of the second conversion beam, and the scattering element is located on the wavelength conversion element, wherein a fourth splitting element and a filter element are further disposed in the second region of the wavelength conversion element, and the fourth splitting element is configured to reflect the second conversion beam, wherein the filter element is disposed on the transmission path of the second conversion beam and configured to filter out a wavelength range of a fourth color beam of the second conversion beam and allow the third color beam of the second conversion beam to pass through.

22. The projection apparatus according to claim 18, wherein a filter element is further disposed in the second region of the wavelength conversion element, wherein the filter element is disposed on a transmission path of the second conversion beam and configured to filter out a wavelength range of a fourth color beam of the second conversion beam and allow the third color beam of the second conversion beam to pass through.

23. The projection apparatus according to claim 18, wherein the illumination system further comprises a first splitting element disposed on transmission paths of the first excitation beam, the first conversion beam, and the second conversion beam, wherein the first splitting element is configured to reflect the first excitation beam and allow the first conversion beam and the second conversion beam to pass through.

24. The projection apparatus according to claim 18, wherein the illumination system further comprises a second light source and a second splitting element, the second light source emits a second beam as the second color beam, the scattering element is disposed on a transmission path of the second beam, and the second splitting element is disposed on transmission paths of the second beam and of the first excitation beam, wherein the first excitation beam is transmitted to the first region and the second light source emits the second beam, and the first excitation beam is transmitted to the second region and the second light source stops emitting the second beam.

25. The projection apparatus according to claim 24, wherein the second splitting element is disposed on transmission paths of the first conversion beam and of the second conversion beam and configured to reflect the second beam and allow the first conversion beam, the second conversion beam, and the first excitation beam to pass through.

26. The projection apparatus according to claim 25, wherein an emitting direction of the first excitation beam is the same as an emitting direction of the second beam.

27. The projection apparatus according to claim 24, wherein the second splitting element is disposed between the second light source and the scattering element, and the second splitting element is configured to reflect the first excitation beam and allow the second beam to pass through.

28. The projection apparatus according to claim 27, wherein an emitting direction of the first excitation beam is opposite to an emitting direction of the second beam.

29. The projection apparatus according to claim 18, wherein the second beam is a red beam.

30. The projection apparatus according to claim 18, wherein the first excitation beam is a laser beam having a blue wavelength range, and the first conversion beam and the second conversion beam are conversion beams having a yellow wavelength range.

31. The projection apparatus according to claim 18, wherein the first excitation beam is transmitted to the second region and the different part of the first excitation beam passes through the wavelength conversion element.

32. The projection apparatus according to claim 18, wherein the first excitation beam is transmitted to the second region and the different part of the first excitation beam is reflected by the wavelength conversion element.

* * * * *